(12) United States Patent
Blackwell, Jr. et al.

(10) Patent No.: US 8,180,191 B2
(45) Date of Patent: May 15, 2012

(54) MOUNTING PLATFORMS FOR INTEGRALLY SUPPORTING AN OPTICAL SPLICE TRAY(S) AND/OR AN OPTICAL SPLITTER(S) IN A MULTI-PORT OPTICAL CONNECTION TERMINAL AND RELATED METHODS

(75) Inventors: Chois A. Blackwell, Jr., North Richland Hills, TX (US); Terry D. Cox, Keller, TX (US); Brian D. Kingsbury, Watauga, TX (US); Diana Rodriguez, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 392 days.

(21) Appl. No.: 12/604,438

(22) Filed: Oct. 23, 2009

(65) Prior Publication Data

US 2011/0097050 A1    Apr. 28, 2011

(51) Int. Cl.
*G02B 6/00* (2006.01)
*G02B 6/36* (2006.01)

(52) U.S. Cl. ............................. 385/135; 385/88; 385/134
(58) Field of Classification Search .................... 385/53, 385/88, 134, 135, 136, 137, 138
See application file for complete search history.

(56) References Cited

U.S. PATENT DOCUMENTS

| | | | | |
|---|---|---|---|---|
| 4,792,203 A * | 12/1988 | Nelson et al. | .................. | 385/135 |
| 5,100,221 A * | 3/1992 | Carney et al. | .................. | 385/135 |
| 5,142,606 A * | 8/1992 | Carney et al. | .................. | 385/134 |
| 5,896,486 A * | 4/1999 | Burek et al. | .................. | 385/135 |
| 6,612,515 B1 * | 9/2003 | Tinucci et al. | ............. | 242/388.1 |
| 2005/0281526 A1 * | 12/2005 | Vongseng et al. | ............. | 385/135 |
| 2011/0097050 A1 * | 4/2011 | Blackwell et al. | ............ | 385/135 |

FOREIGN PATENT DOCUMENTS

| | | |
|---|---|---|
| WO | 91/05281 | 4/1991 |
| WO | 91/10927 | 7/1991 |
| WO | 2005/008307 | 1/2005 |
| WO | 2009/076536 | 6/2009 |
| WO | 2009/089327 | 7/2009 |

* cited by examiner

*Primary Examiner* — Brian Healy
(74) *Attorney, Agent, or Firm* — John H. Vynalek

(57) ABSTRACT

Multi-port optical connection terminals and mounting platforms and related methods designed to secure optical components inside an enclosure of the multi-port optical connection terminals are disclosed. In one embodiment, a multi-port optical connection terminal includes an enclosure comprising a base and a cover configured to attach to the base to define an interior cavity. A mounting platform defining a mounting surface for mounting at least one optical component comprised from the group consisting of at least one splice tray and at least one optical splitter to the at least one mounting surface is provided. A plurality of mounting tabs of the mounting platform are configured to extend into channels disposed in an interior wall of the base. In this manner, the mounting platform and any optical components secured thereto are secured inside the interior cavity, which may prevent damage to optical fibers and/or splices of the optical components.

30 Claims, 20 Drawing Sheets

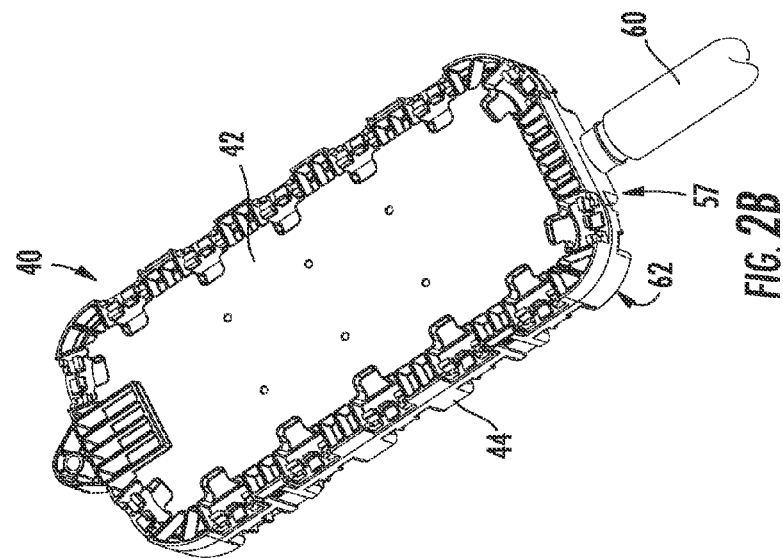
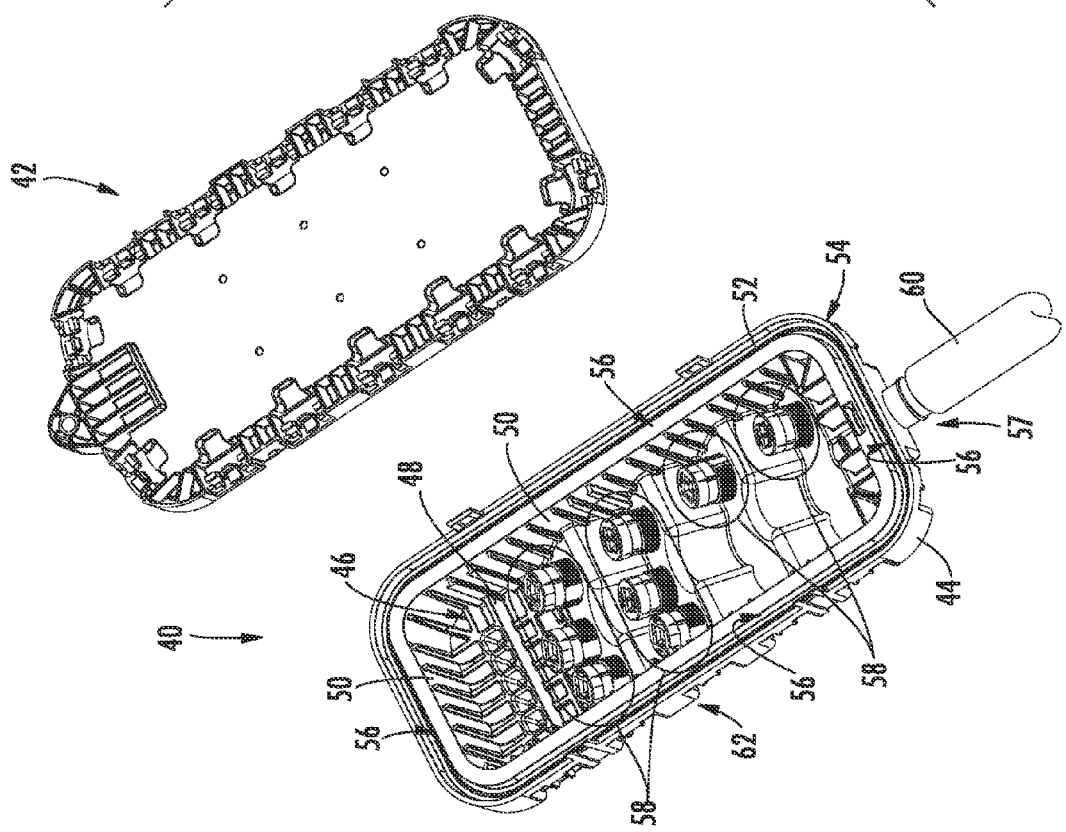
FIG. 2A
FIG. 2B

MOUNTING PLATFORMS FOR INTEGRALLY SUPPORTING AN OPTICAL SPLICE TRAY(S) AND/OR AN OPTICAL SPLITTER(S) IN A MULTI-PORT OPTICAL CONNECTION TERMINAL AND RELATED METHODS

BACKGROUND

1. Field of the Disclosure

The technology of the disclosure relates to an enclosure for interconnecting optical fibers of one or more fiber optic drop cables with optical fibers of a fiber optic distribution cable at a branch point in a fiber optic network.

2. Technical Background

To provide improved performance to subscribers, communication and data networks are increasingly employing optical fiber. The benefits of optical fiber are well known and include higher signal-to-noise ratios and increased bandwidth. As a result of the ever-increasing demand for broadband communications, fiber optic networks typically include a large number of mid-span access locations at which one or more optical fibers are branched from a distribution cable. These mid-span access locations provide a branch point from the distribution cable leading to an end user, commonly referred to as a subscriber, and thus, may be used to extend an "all optical" communications network closer to the subscriber. In this regard, fiber optic networks are being developed that deliver optical fiber connectivity all the way to end subscribers. These initiatives include various fiber-to-the-premises (FTTP), fiber-to-the-home (FTTH), and other fiber initiatives (generally described as FTTx).

Due to the geographical spacing between the service provider and the various subscribers served by each mid-span access location, optical connection terminals may be employed for interconnecting optical fibers. Optical connection terminals can include closures, network terminals, pedestals, and the like. Optical connection terminals can support connection of optical fibers of drop cables extending from the subscribers with optical fibers of the distribution cable extending from the service provider to establish the optical connections necessary to complete the FTTx communications network. Optical connection terminals also provide a furcation point for optical connections. Optical connection terminals can be multiple port (multi-port) connection terminals to facilitate optical connections for multiple optical fibers, and may also include connector ports provided in the form of connectorized fiber optic adapters configured to be optically connected to optical fibers from a received drop cable. In this manner, optical fiber connections can easily be established to the optical fibers in the drop cable by connecting connectorized optical fibers from a subscriber cable(s) to the fiber optic adapters. Such connections can be configured and reconfigured in the field by a relatively unskilled technician.

Because the optical connection terminal is designed to be deployed in rugged conditions, such as outdoors and underground, the optical connection terminal is designed to protect the optical fibers and their optical fiber connections contained in the optical connection terminal. For example, the optical connection terminal may comprise a terminal enclosure configured to receive a terminal cover to seal off the terminal enclosure and protect the optical fibers and optical fiber connections contained therein. Further, because the optical connection terminal may incur forces in the field, such as due to movement when being installed and accessed for example, the optical fibers and optical fiber connections contained therein may also need to be secured inside the optical connection terminal to prevent damage to the optical fibers and/or disconnection of optical fiber connections contained therein.

SUMMARY OF THE DETAILED DESCRIPTION

Embodiments disclosed herein include multiple-port (multi-port) optical connection terminals and mounting platforms designed to secure optical components, including a splice tray(s) and/or optical splitter(s), inside an enclosure of the multi-port optical connection terminals. The mounting platform can prevent the optical components from moving within the optical connection terminal after installed. In this manner, the optical components supporting optical fibers and connections of optical fibers are less susceptible to damage in the optical connection terminals, which may incur forces during deployment and which may be deployed in rugged conditions, such as outdoor and underground. In this regard, one embodiment includes a multi-port optical connection terminal comprising a base and a cover configured to attach to the base and defining an interior cavity. A mounting platform defining at least one mounting surface for mounting at least one optical component comprised from the group consisting of at least one splice tray and at least one optical splitter to the at least one mounting surface is provided. A plurality of mounting tabs extend from the mounting platform each configured to extend into a channel disposed in at least one interior wall of the base of the multi-port optical connection terminal. In this manner, the mounting platform and any optical components secured thereto are secured inside the interior cavity of the multi-port optical connection terminal. Further, the cover of the multi-port optical connection terminal, when secured to the base, further secures the mounting platform and any optical components secured thereto.

In another embodiment, a method for disposing an optical splitter in a multi-port optical connection terminal is disclosed. The method comprises mounting an optical component comprised from the group consisting of a splice tray and an optical splitter to at least one mounting surface of a mounting platform. A plurality of mounting tabs extending from the mounting platform are disposed into a plurality of channels disposed in at least one interior wall of a base to secure the mounting platform inside the base. A cover is attached to the base disposed in the mounting platform and the optical component in an interior cavity.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2A is a perspective view of an exemplary multiple-port (multi-port) optical connection terminal with a terminal cover removed from a base to illustrate connectorized optical fiber ports disposed therein;

FIG. 2B is a perspective view of the multi-port optical connection terminal of FIG. 2A with the terminal cover secured to the base;

DETAILED DESCRIPTION OF THE PREFERRED EMBODIMENTS

Figure 1:
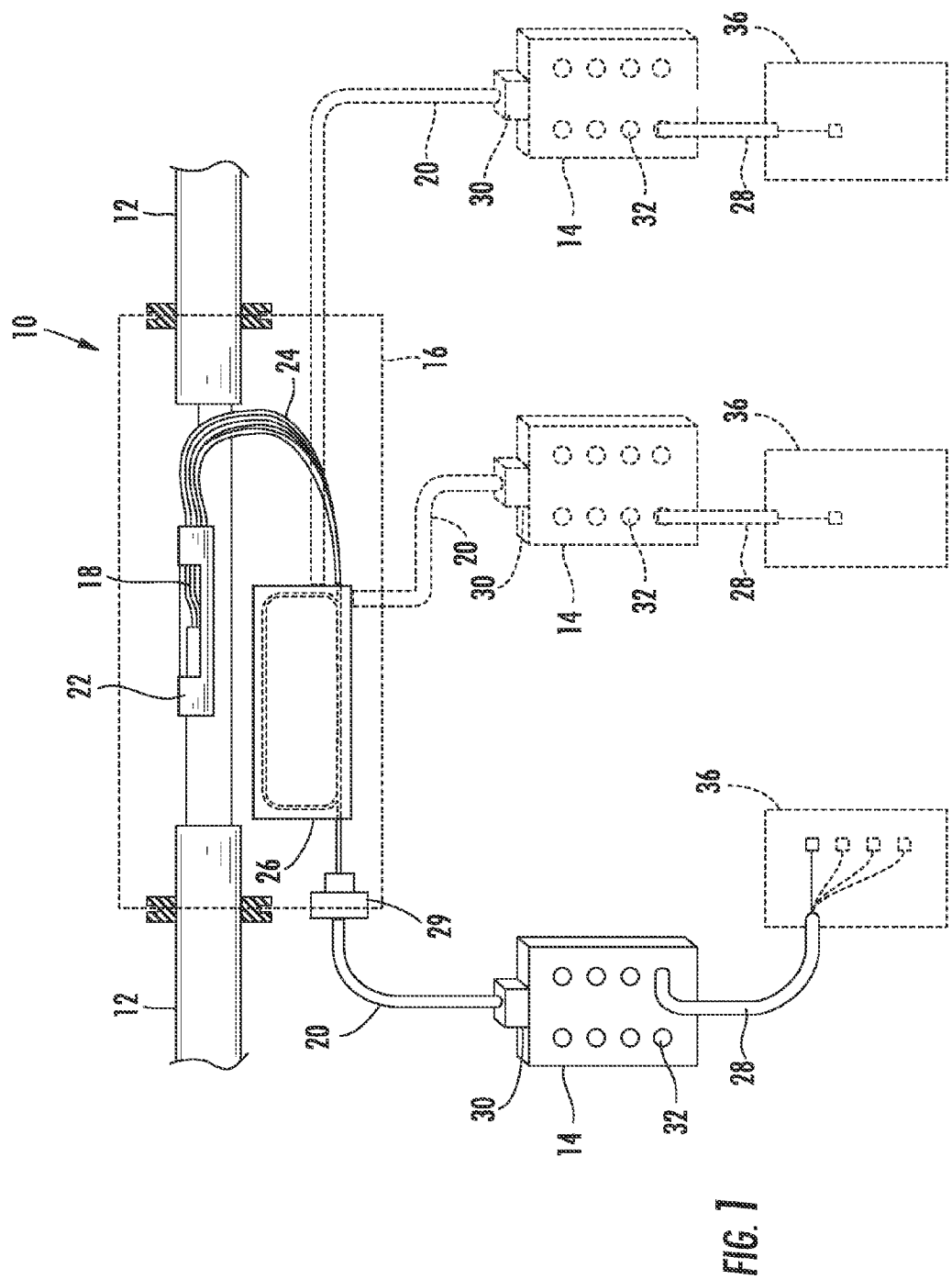
FIG. 1 is a schematic diagram of a portion of an exemplary fiber optic communications network including a network-side cable having a mid-span access location optically connected to a multiple-port (multi-port) optical connection terminal having a subscriber-side cable extending therefrom to provide an optical connection between optical fibers in the network-side cable and optical fibers in the subscriber-side cable.

Reference will now be made in detail to the preferred embodiments of the present invention, examples of which are illustrated in the accompanying drawings, in which some, but not all embodiments are shown. Indeed, the concepts may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

In facilitating the deployment of a fiber optic network, and in particular a FTTP communications network, embodiments disclosed herein permit a communications service provider to factory manufacture and assemble a multi-port optical connection terminal for connection to the optical network at factory-prepared or field-prepared mid-span access locations along the length of a distribution or network cable. As will be appreciated by those skilled in the art, the multi-port optical connection terminal provides an accessible interconnection terminal for readily connecting, disconnecting or reconfiguring drop or subscriber-side cables in the optical network, and in particular, for interconnecting subscriber-side cables with the distribution cable. As used herein, the term "interconnect" or "interconnecting" is intended to describe the connection of a subscriber-side cable to a distribution cable through the multi-port optical connection terminal. In other words, the multi-port terminal provides a quick-connect terminal for connecting subscriber-side cables to a distribution cable of an optical communications network at a location other than the actual mid-span access location provided on the distribution cable.

In this regard, embodiments disclosed in the detailed description include multiple-port (multi-port) optical connection terminals and mounting platforms and related methods designed to secure optical components, including a splice tray(s) and/or optical splitter(s), inside an enclosure of the multi-port optical connection terminals. The mounting platform can prevent the optical components from moving within the optical connection terminal after installed. In this manner, the optical components supporting optical fibers and connections of optical fibers are less susceptible to damage in the optical connection terminals, which may incur forces during deployment and which may be deployed in rugged conditions, such outdoors and underground. In this regard, one embodiment includes a multi-port optical connection terminal comprising a base and a cover configured to attach to the base and defining an interior cavity. A mounting platform defining at least one mounting surface for mounting at least one optical component comprised from the group consisting of at least one splice tray and at least one optical splitter to the at least one mounting surface is provided. A plurality of mounting tabs extend from the mounting platform each configured to extend into a channel disposed in at least one interior wall of the base of the multi-port optical connection terminal. In this manner, the mounting platform and any optical components secured thereto are secured inside the interior cavity of the multi-port optical connection terminal. Further, the cover of the multi-port optical connection terminal, when secured to the base, further secures the mounting platform and any optical components secured thereto.

Before discussing the particular features of the multi-port optical connection terminals disclosed herein, which are illustrated in FIGS. 2A-16 and described in detail below, an exemplary interconnection of subscriber-side optical fibers to distribution optical fibers in an exemplary fiber optic distribution cable of a fiber optic communications network through a multi-port optical connection terminal is described. In this regard, FIG. 1 illustrates an exemplary fiber optic communications network 10. The fiber optic communications network 10 comprises a fiber optic distribution cable 12 (or "distribution cable") and at least one multi-port optical connection terminal 14. At least one (as shown in FIG. 1), and typically, a plurality of mid-span access locations are provided along the length of fiber optic distribution cable 12. The mid-span access locations may be factory-prepared with preterminated or pre-connectorized optical fibers at predetermined branch points on a distribution cable for a pre-engineered fiber optic communications network. Alternatively, the mid-span access locations may be field-prepared at branch points formed on a previously deployed distribution cable. Regardless, the mid-span access location is enclosed and protected from exposure to the environment by a conventional closure 16.

As shown in FIG. 1, the distribution cable 12 can be factory-prepared with at least one mid-span access location for providing access to at least one preterminated optical fiber 18 at a predetermined branch point in the fiber optic communications network 10. In one embodiment, the fiber optic communications network 10 comprises the distribution cable 12 having a plurality of mid-span access locations at branch points spaced along the length of the distribution cable 12, each providing access to at least one, and preferably, a plurality of preterminated optical fibers 18 of the fiber optic communications network 10. Thus, the distribution cable 12 provides multiple locations for joining a stub cable 20 of at least one multi-port optical connection terminal 14 to the distribution cable 12 at each mid-span access location.

With continuing reference to the exemplary fiber optic communications network 10 of FIG. 1, preterminated optical fibers 18 of the distribution cable 12 provided at the mid-span access location are routed out of the distribution cable 12 via an optical fiber transition element 22 and into corresponding hollow protective tubes 24. The optical fiber transition element 22 may comprise any structure that permits the preterminated optical fibers 18 to transition from the distribution cable 12 without excessive stress, strain or bending. The protective tubes 24 containing the preterminated optical fibers 18 can be routed into one or more splice trays 26 wherein the ends of the preterminated optical fibers 18 are spliced to respective optical fibers of the stub cable 20 extending from the multi-port optical connection terminal 14.

The preterminated optical fibers 18 and/or the optical fibers of the stub cable 20 may be pre-connectorized in the factory, or may be connectorized in the field (for example, mechanically spliced to field-installable connectors or dressed and fusion spliced to pigtails), and the splice trays 26 replaced with conventional connector adapter sleeves. Alternatively, the preterminated optical fibers 18 may be accessed in the field at a mid-span access location, dressed, and spliced or connectorized in any manner and optically connected to respective optical fibers of the stub cable 20. Regardless, the optical fibers of the stub cable 20 enter the closure 16 through a suitable cable port 29 provided through an exterior wall, for example an end wall, of the closure 16. The stub cable 20 includes at least one, and preferably a plurality of optical fibers disposed within a protective cable sheath. As will be readily appreciated by those skilled in the art, the stub cable 20 may be any known fiber optic cable comprising at least one optical fiber and having a fiber count equal to or greater than that of a subscriber-side cable 28 to be connected to the multi-port optical connection terminal 14 and equal to or less than that of the distribution cable 12. The stub cable 20 may comprise a tubular body, such as, but not limited to, a buffer tube, a monotube or a tube formed from a water-swellable tape. In preferred embodiments, the stub cable 20 is flexible, easy to route and has no preferential bend.

With continuing reference to FIG. 1, the stub cable 20 extends from the closure 16 into the multi-port optical connection terminal 14 through a stub cable port 30 provided through an exterior wall of the multi-port optical connection terminal 14. The optical fibers of the stub cable 20 within the multi-port optical connection terminal 14 can be pre-connectorized wherein the optical connectors are inserted into a conventional adapter sleeve seated in a respective one of connector ports 32 provided through an exterior wall of the multi-port optical connection terminal 14. At least one, and preferably, more than one pre-connectorized subscriber-side cable 28 can thereafter be interconnected with a respective connectorized optical fiber of the stub cable 20 by inserting the pre-connectorized end of the subscriber-side cable 28 into the adapter sleeve seated in the connector port 32 from the exterior of the multi-port optical connection terminal 14. The stub cable port 30 of the multi-port optical connection terminal 14 sealingly receives the stub cable 20, and the plurality of connector ports 32 are operable for receiving the pre-connectorized optical fibers of the stub cable 20 and the connectorized ends of the subscriber-side cables 28.

The subscriber-side cables 28 comprise at least one single mode or multimode optical fiber of any type optically connected to a single fiber or multi-fiber optical connector in a conventional manner. The other ends of the subscriber-side cables 28 are optically connected to respective optical fibers of the fiber optic communications network 10 within a conventional outside plant connection terminal 36, such as an outside plant network access point (NAP) closure, local convergence cabinet (LCC), terminal, pedestal or network interface device (NID) of the types available from Corning Cable Systems LLC of Hickory, N.C. In the example illustrated in FIG. 1 by solid lines, the stub cable 20 extends from the closure 16 to a multi-port optical connection terminal 14 positioned at a distance from the mid-span access location, such as a telephone pole, hand-hole, vault or pedestal (not shown) in the fiber optic communications network 10. Each subscriber-side cable 28 can be extended from the multi-port optical connection terminal 14 to the conventional outside plant connection terminal 36 located at a subscriber premises.

FIGS. 2A and 2B are perspective views of an exemplary multi-port optical connection terminal 40 that may be employed as the multi-port optical connection terminal 14 of FIG. 1. FIG. 2A illustrates the multi-port optical connection terminal 40 with a cover 42 removed from a base 44. The base 44 is comprised of an internal cavity 46 that is formed by a bottom portion 48 surrounded by walls 50 extending orthogonally therefrom. When the cover 42 is secured to the base 44, as illustrated in FIG. 2B, the interior cavity 46 is closed or sealed off. Thus, any optical fibers or optical components contained inside the interior cavity 46 are closed or sealed off from the environment. If the multi-port optical connection terminal 40 is deployed in rugged conditions, such as outdoors or underground, the multi-port optical connection terminal 40 serves to protect the optical fibers and optical components contained inside the interior cavity 46 from such conditions and damage. A seal 52, such as a rubber ring or gasket for example, may be further disposed in a channel 54 that extends circumferentially around interior portions 56 of the walls 50 of the base 44 to provide a tight seal between the interior cavity 46 and the environment when the cover 42 is secured to the base 44, thus preventing contaminant, such as water, from reaching the interior cavity 46. The cover 42 can be permanently secured to the base 44, such as by providing a weld in the channel 54 before the cover 42 is attached to the base 44 as an example. Alternatively, the cover 42 may be secured to the base 44 such that the cover 42 is intended to be able to be removed from the base 44.

A cable port 57 is disposed in the base 44 to receive a stub or distribution cable 60. The distribution cable 60 can include a single optical fiber or multiple optical fibers. A plurality of connector ports 58, comprised of fiber optic adapters in this embodiment, are disposed in the base 44 as shown in FIG. 2A and configured to receive pre-connectorized optical fibers (not shown) to establish optical connections with optical fibers in the distribution cable 60. In this embodiment, the multi-port optical connection terminal 40 supports up to eight (8) connector ports 58. The plurality of connector ports 58 are also disposed through and extend outside of the base 44 on a bottom side 62 of the base 44 (illustrated in FIG. 7B) to allow connectorized ends of the subscriber-side cables (not shown) to be connected to the plurality of connector ports 58. When connected, an optical connection is established between optical fibers in the subscriber-side cables and optical fibers in the distribution cable 60.

It may be desirable to provide for the ability of a multi-port optical connection terminal to support one or more splice trays or optical splitters to support fiber optic connections in the multi-port optical connection terminal. For example, it may be desired to provide for the ability for optical fibers from the distribution cable 60 in FIGS. 2A and 2B to be spliced to optical fiber pigtails connected to the connector ports 58. In this regard, a splice tray could be provided to provide splices to allow technicians to more easily splice optical fibers from the distribution cable 60 into optical fiber pigtails connected to the connector ports 58. As another example, it may be desired to provide for the ability to split an optical fiber from the distribution cable 60 into a plurality of optical fibers connected to the connector ports 58. In this manner, the multi-port optical connection terminal 40 could allow multiple subscriber-side optical fibers to be connected to the same optical fiber in the distribution cable 60 to receive the same optical signals. However, optical splices and optical fibers from an optical splitter would be susceptible to damage when located inside the multi-port optical connection terminal 40.

Figure 3:
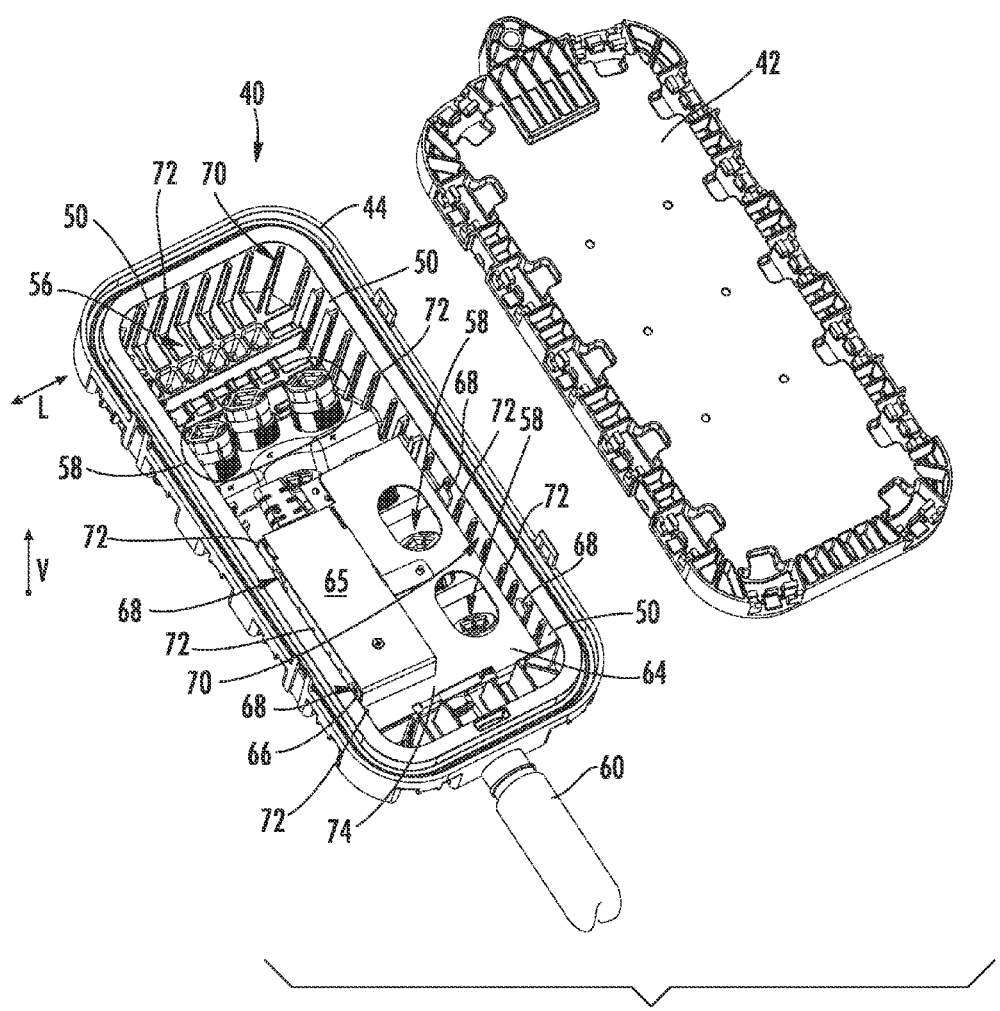
FIG. 3 is a perspective view of the multi-port optical connection terminal of FIGS. 2A and 2B, having an exemplary mounting platform disposed therein for securing an exemplary splice tray and an exemplary optical splitter inside the multi-port optical connection terminal.

In this regard, as illustrated in FIG. 3, the multi-port optical connection terminal 40 in this embodiment is configured to support and secure a mounting platform 64. As will be described in more detail below, the mounting platform 64 contains at least one mounting surface for mounting at least one optical component to secure the optical component inside the interior cavity 46 to prevent damage to the optical component and/or optical fibers connected thereto. As illustrated in FIG. 3 and described in more detail below, the mounting platform 64 in this embodiment includes a plurality of mounting tabs (element 66 in FIG. 4) that extend from the mounting platform 64 and are configured to extend into channels 68 disposed in an interior portion 56 of one or more walls 50 of the base 44 of the multi-port optical connection terminal 40. The channels 68 in this embodiment are formed between ribs 72 integrally formed into the base 44 disposed in the interior portions 56 of the walls 50 and disposed parallel to each other. The ribs 72 may be integrally formed into the mold for the base 44 as an example.

Linkage members 88 (FIG. 5A) may be disposed between mounting tabs 66 and the mounting platform 64 thereto secured from lateral movement (indicated as direction L in FIG. 3) inside the interior cavity 46 of the multi-port optical connection terminal 40. In this regard in this embodiment, no fasteners are required to attach and secure the mounting platform 64 in the interior cavity 46 of the base 44. Further, when the cover 42 is secured to the base 44, the cover 42 further secures the mounting platform 64 and optical components mounted thereon from vertical movement (indicated as direction of V in FIG. 3) about the interior cavity 46.

In embodiments described herein, the optical components that can be secured to the mounting platform include a splice tray(s) and an optical splitter(s). For example, as illustrated in FIG. 3, an optical splitter 65 is mounted and secured to a top surface 74 of the mounting platform 64. Alternatively, a splice tray (not shown) could be mounted and secured to the top surface 74 of the mounting platform 64. Further, because the multi-port optical connection terminal 40 in this embodiment is configured to support the mounting platform 64 in a raised configuration from the bottom portion 48 of the base 44, optical components, including a splice tray or an optical splitter, can also be mounted and secured to a bottom surface (element 98 in FIG. 5B) of the mounting platform 64. The top surface 74 may be considered to be a first surface of the mounting platform, and the bottom surface 98 may be considered a second surface, or vice versa.

Figure 4:
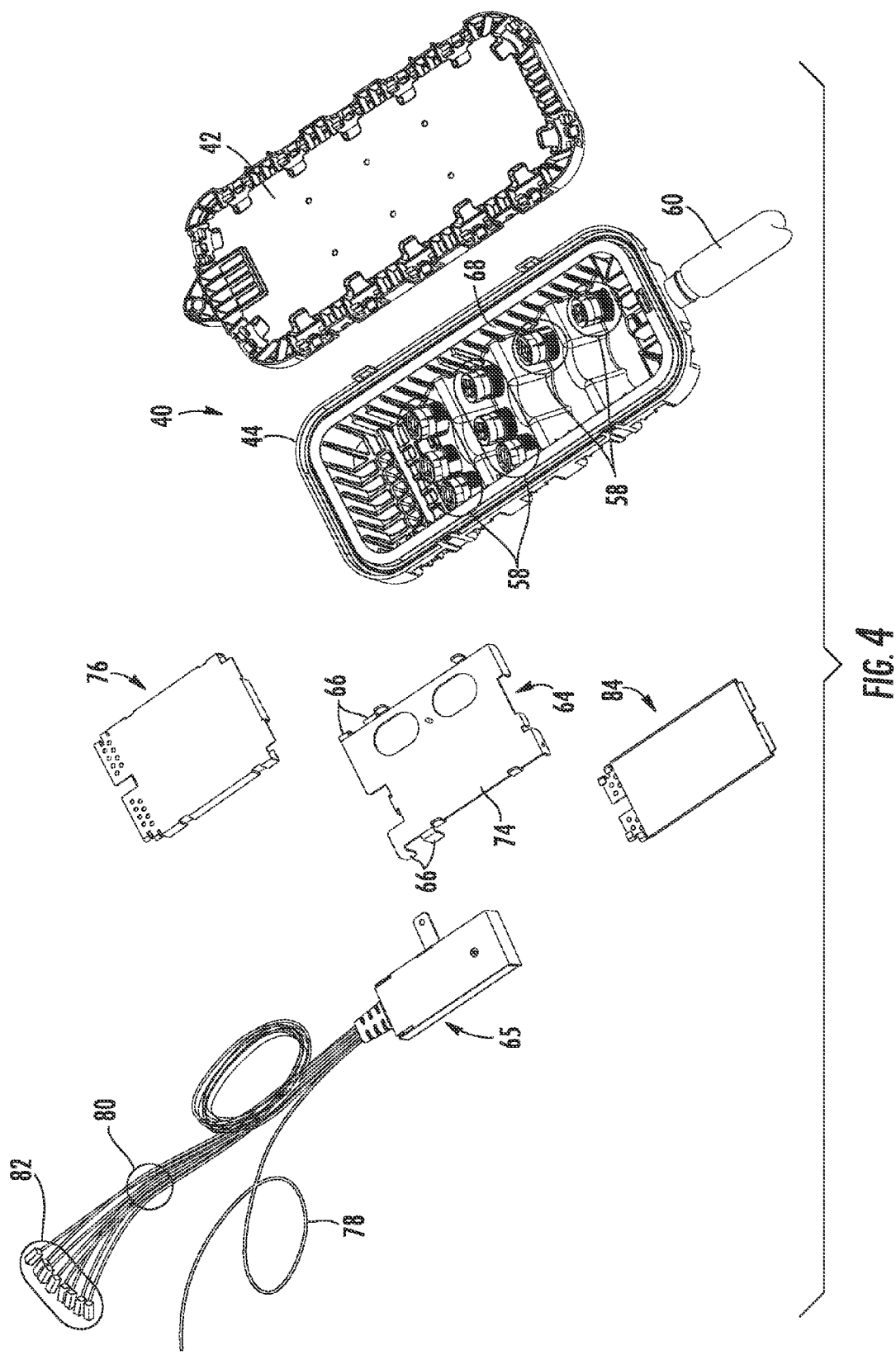
FIG. 4 is a perspective breakout view of multi-port optical connection terminal of FIG. 3.

To further illustrate, FIG. 4 provides a perspective breakout view of the multi-port optical connection terminal 40 of FIG. 3. As illustrated therein, the mounting platform 64 is shown in an orientation where the top surface 74 of the mounting platform 64 is shown. Four mounting tabs 66 are provided in the mounting platform 64 configured to be disposed in the channels 68 disposed in the base 44. One or more of the mounting tabs 66 may be designed to friction fit in the channel 68. Further, the one or more of the mounting tabs 66 may be configured to align the mounting platform 68 with a channel 68 and not friction fit in the channel 68, while another mounting tab 66 may be configured to friction fit with a channel 68. The mounting platform 64 in this embodiment is configured to support the mounting of the optical splitter 65 on the top surface 74 of the mounting platform 64 and/or the mounting of a splice tray 76 on a bottom surface 98 (FIG. 5B) of the mounting platform 64, as will be described in more detail below with regard to FIGS. 6A-12. The optical splitter 65 contains an input fiber 78 that can be connected to an optical fiber in the distribution cable 60 to split the distribution cable 60 into a plurality of connectorized output fibers 80. Fiber optic connectors 82 can be connected to the connector ports 58 disposed in the base 44 of the multi-port optical connection terminal 40 to establish connections between optical fibers in the distribution cable 60 and subscriber-side optical fibers (not shown) connected to the connector ports 58 exposed on the bottom side 62 of the base 44. The mounting platform 64 in this embodiment is also configured to support a splice tray 84 on the top surface 74 of the mounting platform 64, as will be described in more detail below with regard to FIGS. 13-16.

Figure 5A:
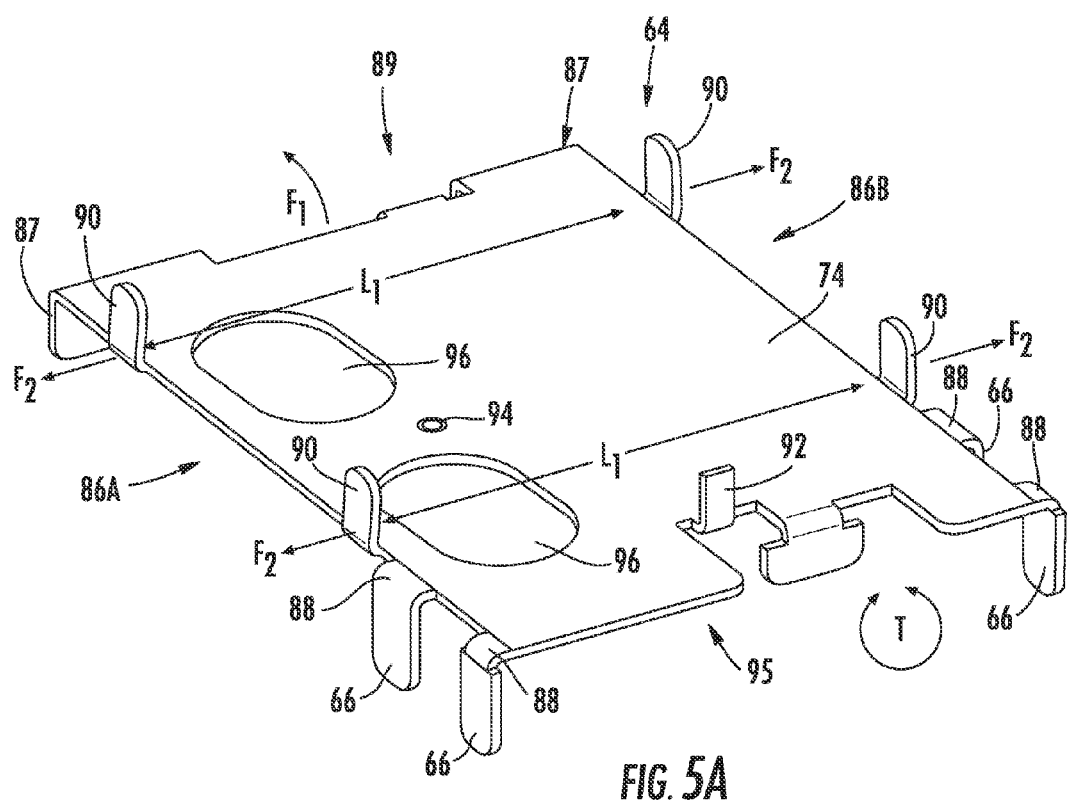
FIGS. 5A and 5B are perspective views of the top and bottom sides, respectively, of the mounting platform illustrated in FIG. 3.
Figure 5B:
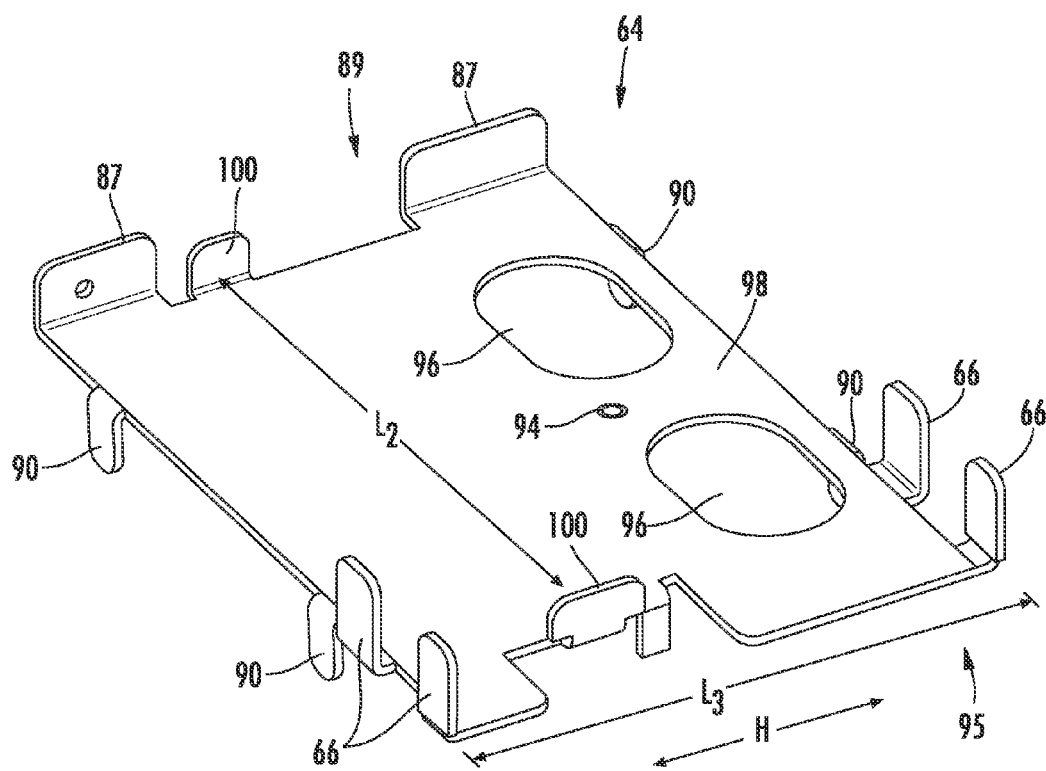

FIGS. 5A and 5B are perspective views of the top and bottom sides, respectively, of the mounting platform 64 illustrated in FIG. 3 to illustrate more detail regarding the mounting tabs 66. The mounting tabs 66 and other means for securing optical components, including the splice trays 76, 84 and optical splitter 65 in FIG. 4, to the mounting platform 64, and in the multi-port optical connection terminal 40 when the mounting platform 64 with such mounted optical components is installed in the base 44, are also illustrated in FIGS. 5A and 5B. As illustrated in FIG. 5A, the top surface 74 of the mounting platform 64 is illustrated. In this embodiment, either a portion or the entire top surface 74 can serve as a mounting surface for mounting an optical component to the top surface 74 as will be described in more detail below. The mounting tabs 66 in this embodiment are formed as part of the mounting platform 64 and extend downward orthogonally from sides 86A, 86B from the plane of the top surface 74 (or top plane) to fit inside the channels 68 in the base 44, as previously discussed and illustrated in FIG. 3. The mounting platform 64 may be formed from sheet metal wherein the mounting tabs 66 are bent downward about the mounting platform 64. Alternatively, the mounting platform 64 may be formed from a polymer wherein the mounting tabs 66 are formed as part of the mold of the mounting platform 64, such as through an injection or extrusion process. Linkage members 88 are also formed as part of the mounting tabs 66 or provided between the sides 86A, 86B and the mounting tabs 66 to provide spacing between the perimeter of the mounting platform 64 and the interior portions 56 of the walls 50 of the base 44 when the mounting platform 64 is mounted therein.

Figure 6A:
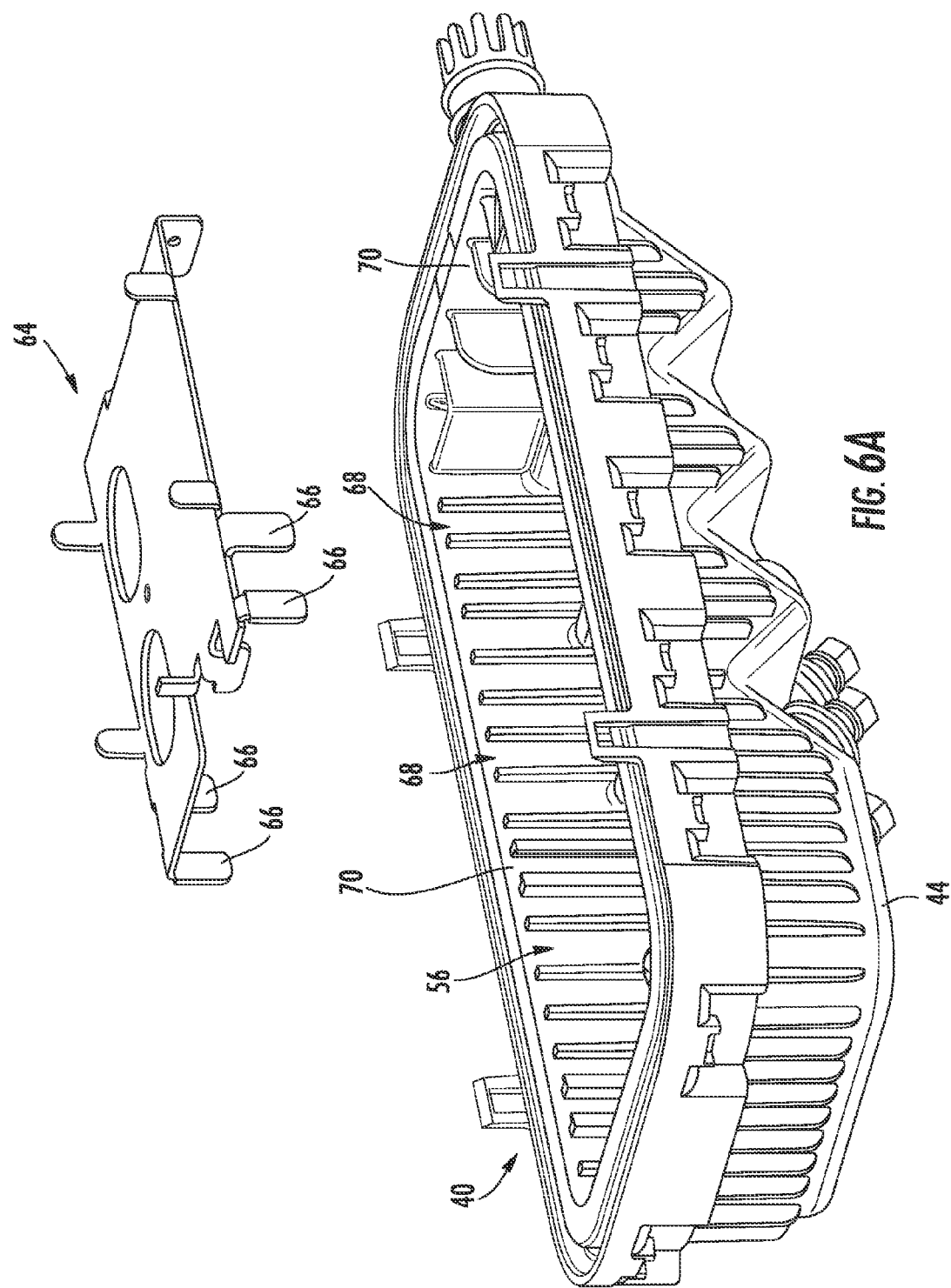
FIG. 6A is a perspective view of the mounting platform of FIGS. 5A and 5B disposed above the base of the multi-port optical connection terminal of FIGS. 2A and 2B prior to securing the mounting platform to the base.
Figure 6B:
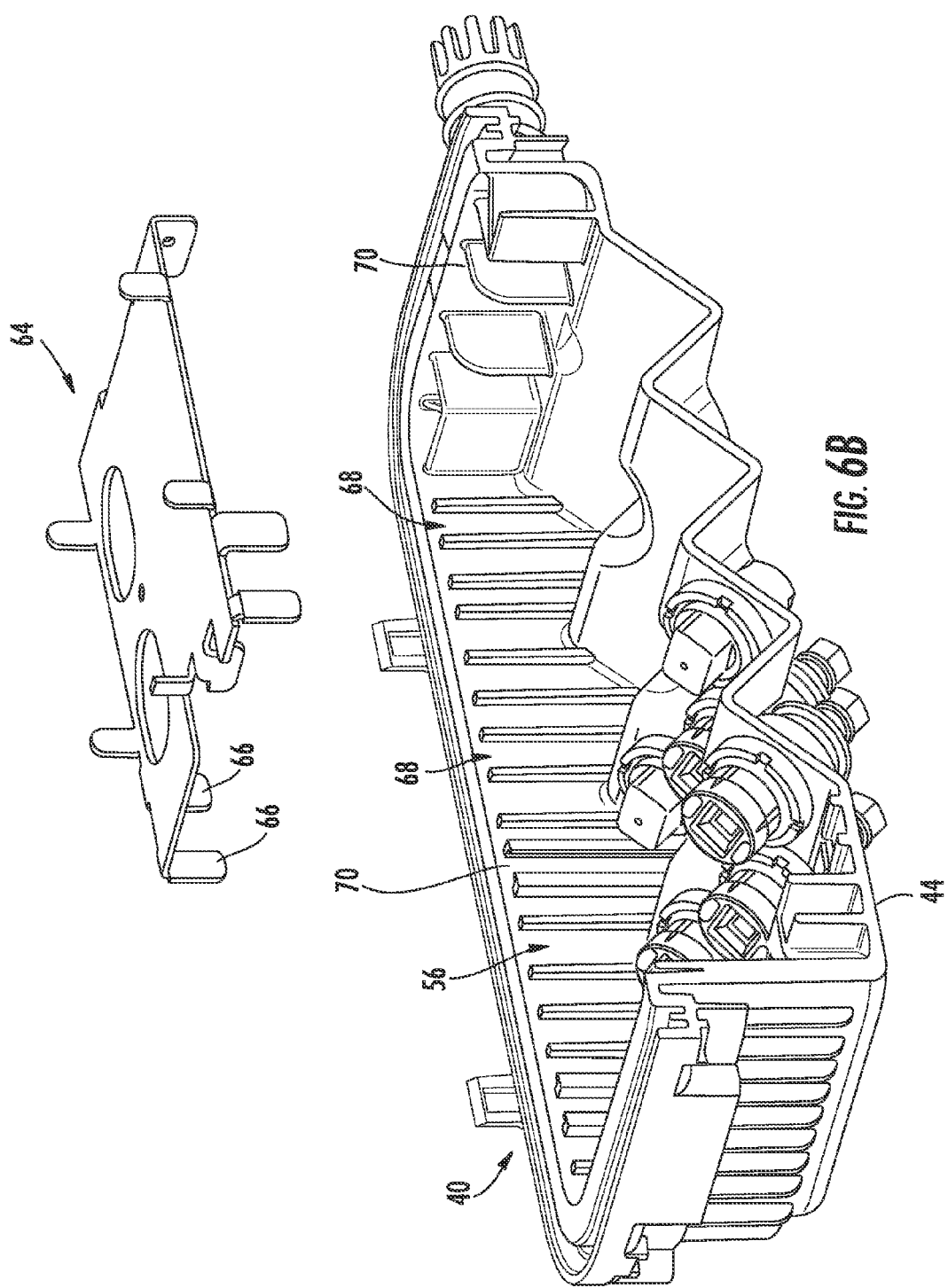
FIG. 6B is a cross-sectional view of FIG. 6A.
Figure 7A:
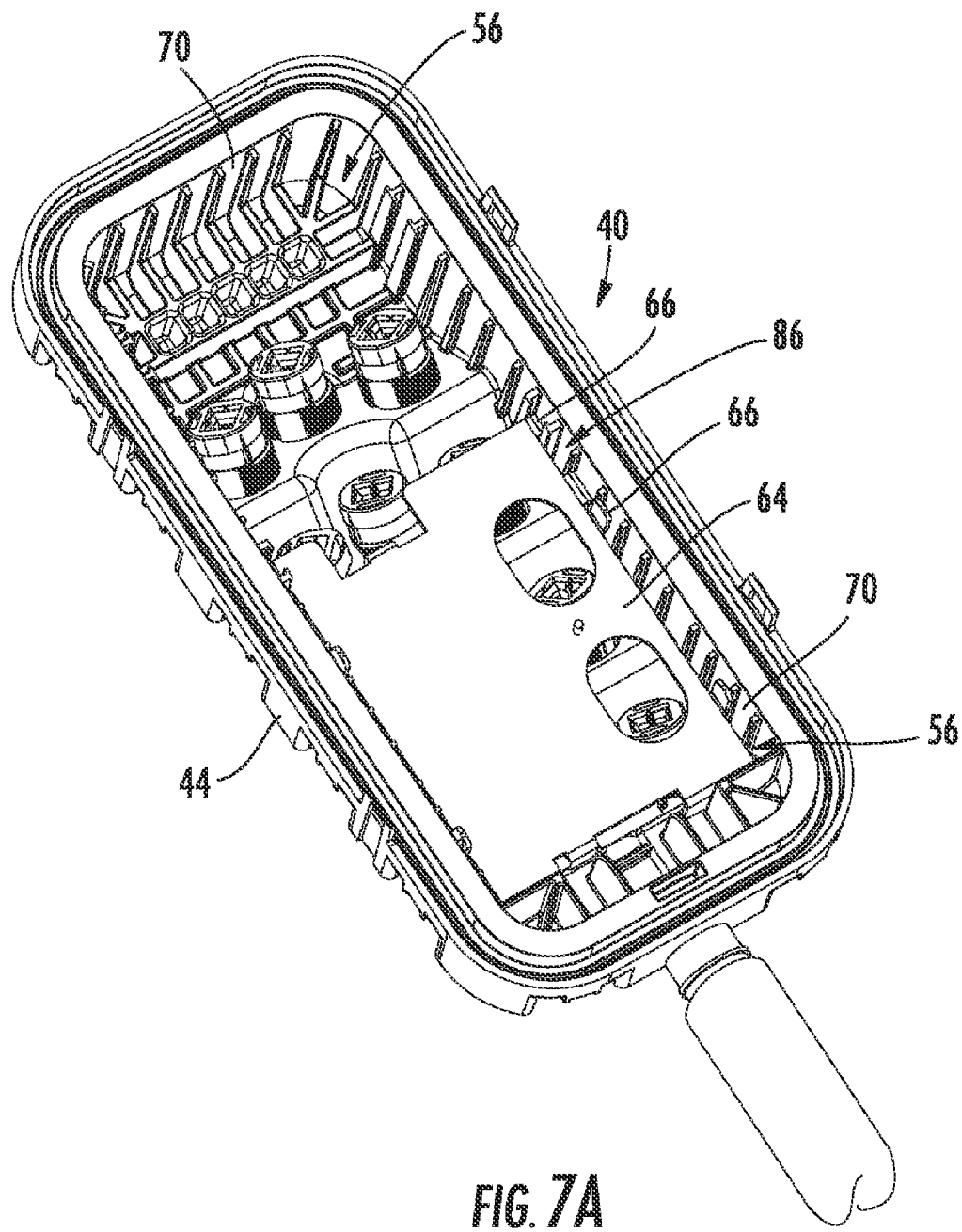
FIG. 7A is a perspective view of the mounting platform of FIGS. 5A and 5B mounted inside the base of the multi-port optical connection terminal of FIGS. 2A and 2B.
Figure 7B:
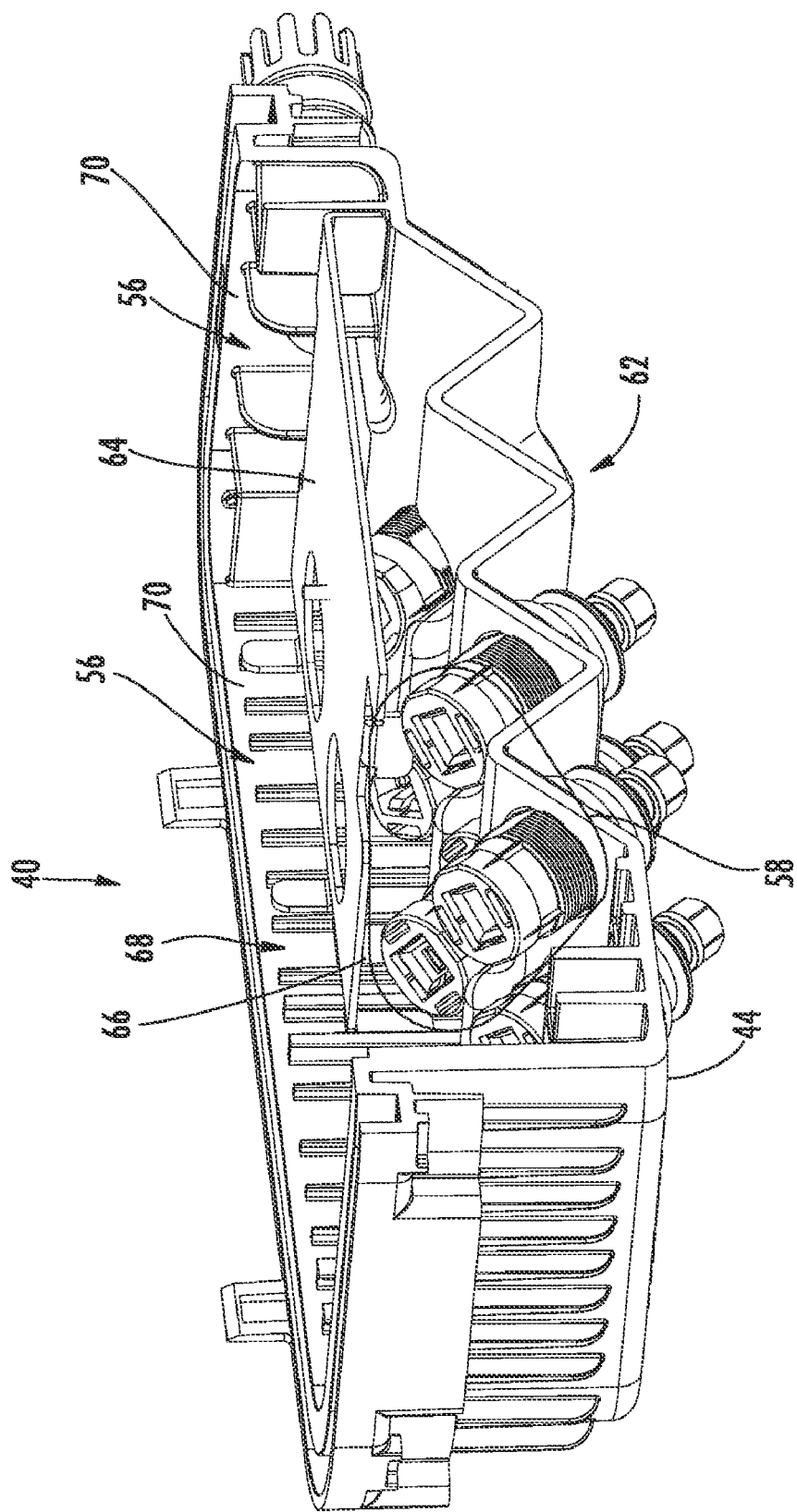
FIG. 7B is a cross-sectional view of FIG. 7A.
Figure 7C:
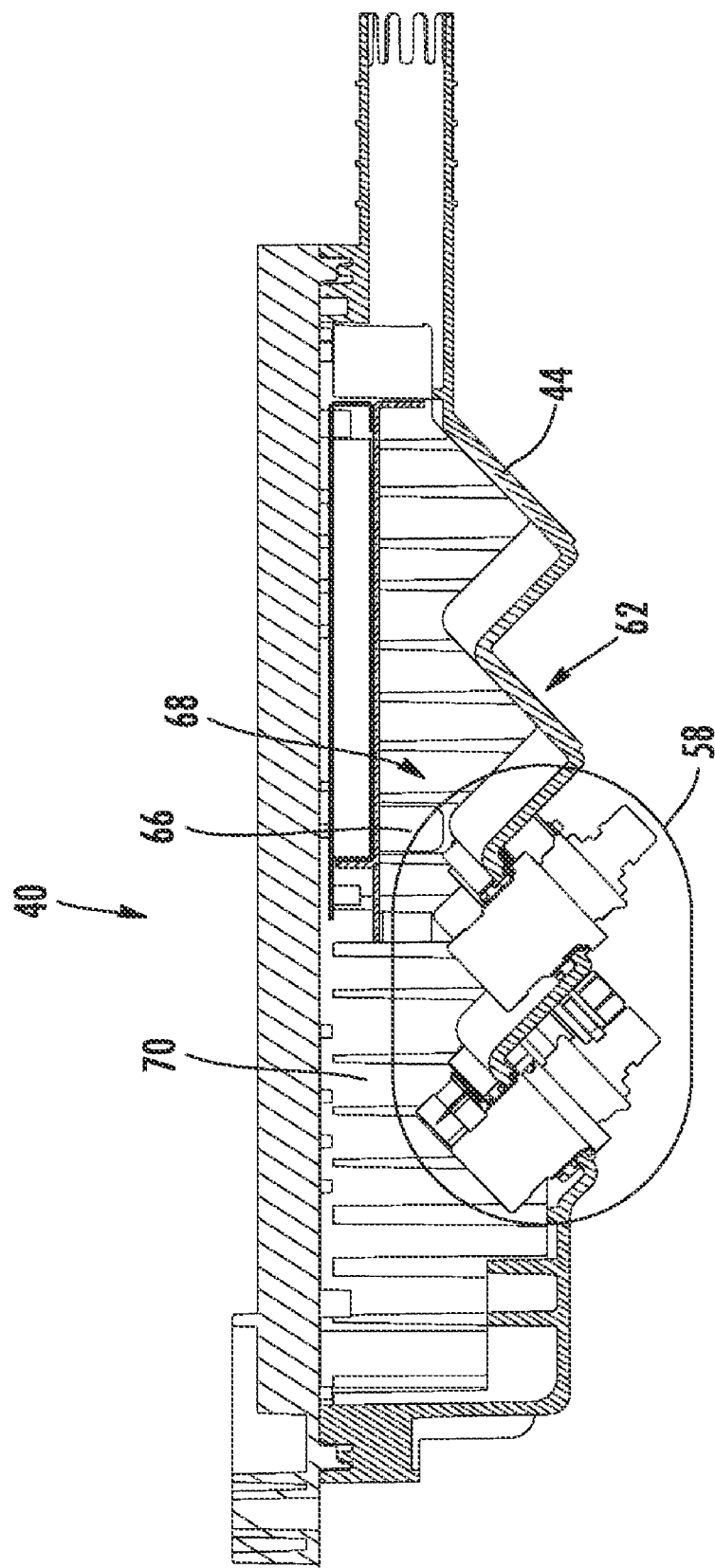
FIG. 7C is a side view of the cross-section of FIG. 7B.

For further illustration, FIG. 6A shows a perspective view of the mounting platform 64 located above the base 44 before the mounting platform 64 is disposed in the base 44. No optical components are shown as being mounted on the mounting platform 64 in FIG. 6A for clarity, although it is understood that one or more optical components are typically mounted on the mounting platform 64 before being disposed in the base 44. FIG. 6B is a cross-sectional view of FIG. 6A for further illustration. As previously discussed, the mounting tabs 66 of the mounting platform 64 are disposed in the channels 86 in the interior portion 56 of the walls 50 of the base 44. For further illustration, FIG. 7A illustrates a perspective side view the mounting platform 64 disposed in the base 44. FIG. 7B is a cross-sectional view of FIG. 7A. FIG. 7C is a side view of FIG. 7B for further illustration and understanding and which, in addition, includes the first splice tray 84 (FIG. 4) mounted on the bottom surface 98 of the mounting platform 64, as will be described in more detail below with regard to FIGS. 8A-10. As illustrated in FIGS. 7A-7C, the mounting tabs 66 are disposed in the channels 86 in the interior portion 56 of the walls 50 of the base 44 when the mounting platform 64 is disposed and installed in the base 44.

In this embodiment, as illustrated in FIGS. 5A, 6A-6B, and 7A-7C, two mounting tabs 66 are provided on each side 86A, 86B of the mounting platform 64 to prevent or reduce turning or torsional motion of the mounting platform 64 about the multi-port optical connection terminal 40 when mounted in the base 44 (indicated as direction T in FIG. 5A). However, only one mounting tab 66 could be provided on one or both of the sides 86A, 86B of the mounting platform 64, if desired. Further, in this embodiment, two mounting tabs 66 are provided on each side 86A, 86B of the mounting platform 64 to prevent or reduce flex movement of an end 89 of the mounting platform 64 (indicated as direction $F_1$ in FIG. 5A). However, one or more than one mounting tab 66 may be provided on one of the sides 86A, 86B, if desired. Further, as shown in FIGS. 5A and 5B, the mounting platform 64 can also include stand-off tabs 87 that are configured to engage with the base 44 when the mounting platform 64 is mounted in the base 44 to prevent the mounting platform 64 from flexing.

With reference back to FIG. 5A, optical component tabs provided in the form of locking tabs 90 are disposed on the sides 86A, 86B of the mounting platform 64 to secure an optical component, including the optical splitter 65 or the splice tray 76 in FIG. 4, mounted to the top surface 74 of the mounting platform 64. The locking tabs 90 are designed in this embodiment to be biased inward to provide a spring force when flexed outward from the mounting platform (indicated as direction $F_2$ in FIG. 5A) when a force is placed on the locking tabs 90. In this manner, an optical component can be designed of a length slightly larger than a length $L_1$ between the locking tabs 90, as illustrated in FIG. 5A, to compression fit between the locking tabs 90 and thus be secured to the top surface 74 of the mounting platform 64. The spring force provided by the locking tabs 90 when pushed outward applies a force to the optical component when disposed between the locking tabs 90. Alternatively, the optical component could be designed to be of length $L_1$ and include notches that align with and receive the locking tabs 90. If the optical component to be mounted to the top surface 74 of the mounting platform 64 has a length less than the length $L_1$, the optical component can be abutted against the locking tabs 90 on one side 86B of the mounting platform 64 and secured to a mounting orifice 94 disposed in the top surface 74 of the mounting platform 64 illustrated in FIG. 5A. In this scenario, access openings 96 provide access to the connector ports 58 that may be located underneath the mounting platform 64 when installed in the base 44, as will be described in more detail below.

An optical component tab provided in the form of a positioning tab 92 controls the spacing of an optical component mounted to the top surface 74 relative to a near end 95 of the mounting platform 64. Similar to the mounting tabs 66, the locking tabs 90 and/or positioning tab 92 may be attached or formed as part of the mounting platform 64. The locking tabs 90 and the positioning tab 92 may be made from sheet metal wherein the locking tabs 90 and/or the positioning tab 92 are bent upward about the top surface 74 of the mounting platform 64. Alternatively, the mounting platform 64 may be formed from a polymer wherein the locking tabs 90 and/or the positioning tab 92 are formed as part of the mold of the mounting platform 64, such as through an injection or extrusion process.

To provide for the ability to secure additional optical components in the multi-port optical connection terminal 40, the mounting platform 64 in this embodiment is also configured to support an optical component mounted to a bottom surface of the mounting platform 64. An additional optical component may be mounted to the bottom surface of the mounting platform 64 in addition to or in lieu of an optical component mounted to the top surface 74 of the mounting platform 64. In this regard, FIG. 5B illustrates the mounting platform 64 of FIG. 5A, with a bottom surface 98 of the mounting platform 64 shown. Like the top surface 74 of the mounting platform 64, the bottom surface 98 is configured to receive and secure an optical component to the mounting platform 64. In this regard, locking tabs 100 may be attached or formed as part of the mounting platform 64 similar to the locking tabs 90 to secure optical components mounted to the bottom surface 98 of the mounting platform 64. An optical component may be mounted between the locking tabs 100. Similar to the locking tabs 90, the locking tabs 100 may be biased inward such that a spring force is present when the locking tabs 100 are pushed outward. The optical component may be provided of a length that is slightly larger than length $L_2$ between the locking tabs 100 such that the locking tabs 100 apply the spring force to the optical component to compression fit the optical component between the locking tabs 100. Alternatively, the optical component to be mounted to the bottom surface 98 could be designed to be of length $L_2$ and include notches that align with and receive the locking tabs 100.

Further, the mounting tabs 66 also serve to confine an optical component mounted to the bottom surface 98 of the mounting platform 64 in this embodiment, as illustrated in FIG. 5B. The mounting tabs 66 prevent movement of an optical component in the horizontal direction (indicated as direction H in FIG. 5B). An optical component to be mounted to the bottom surface 98 may be provided of a length that is slightly larger than length $L_3$ between the mounting tabs 66 to compression fit the optical component between the mounting tabs 66. Alternatively, the optical component could be designed to be of length $L_3$ and include notches that align with and receive the mounting tabs 66.

Figure 8B:
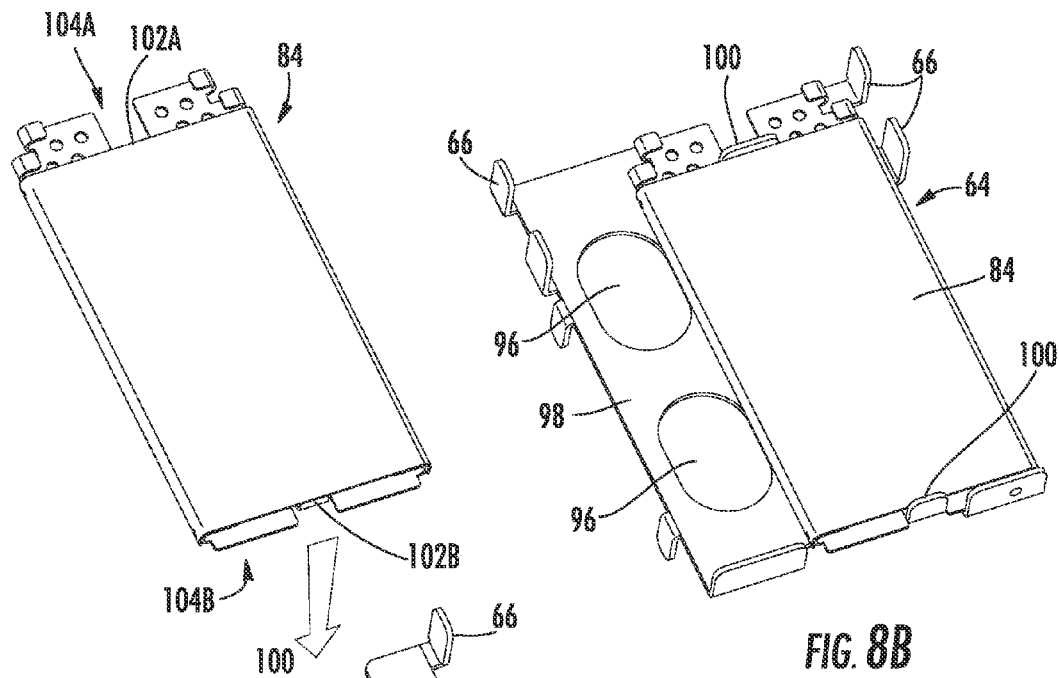
FIG. 8B is a perspective view of the splice tray of FIG. 8A mounted to the bottom side of the mounting platform of FIGS. 5A and 5B.
Figure 8A:
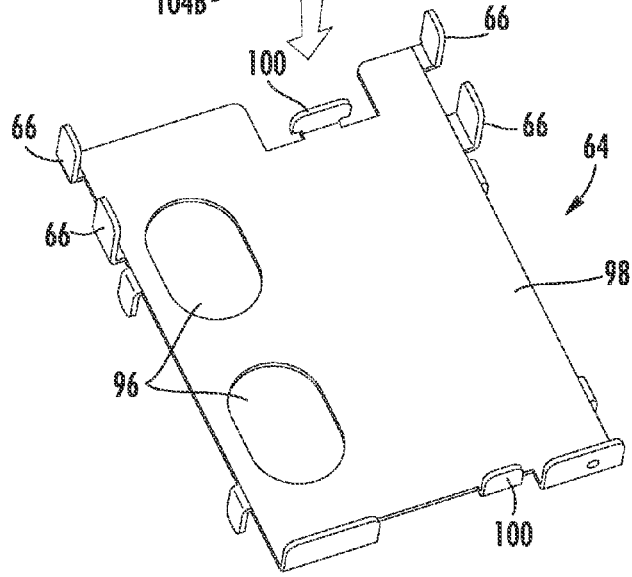
FIG. 8A is a perspective view of a splice tray disposed above the bottom side of the mounting platform of FIGS. 5A and 5B.

Now that the exemplary features of the mounting platform 64 have been discussed, the remainder of this application provides examples of mounting exemplary optical components to the mounting platform 64 such that these exemplary optical components can be secured in the multi-port optical connection terminal 40. In this regard, FIGS. 8A and 8B provide perspective views that illustrate the process of mounting the exemplary splice tray 84 in FIG. 4 to the bottom surface 98 of the mounting platform 64. FIG. 8A illustrates the splice tray 84 prior to mounting to the bottom surface 98 of the mounting platform 64. FIG. 8B illustrates the splice tray 84 mounted to the bottom surface 98 of the mounting platform 64.

As illustrated in FIG. 8A, the splice tray 84 is illustrated along with the mounting platform 64 before the splice tray 84 is mounted to the bottom surface 98 of the mounting platform 64. The splice tray 84 contains two notches 102A, 102B on opposites ends 104A, 104B such that when the splice tray 84 is placed onto the bottom surface 98 of the mounting platform 64 as illustrated in FIG. 8B, the locking tabs 100 are disposed in the notches 102A, 102B to secure the splice tray 84 to the bottom surface 98 of the mounting platform 64.

Figure 9:
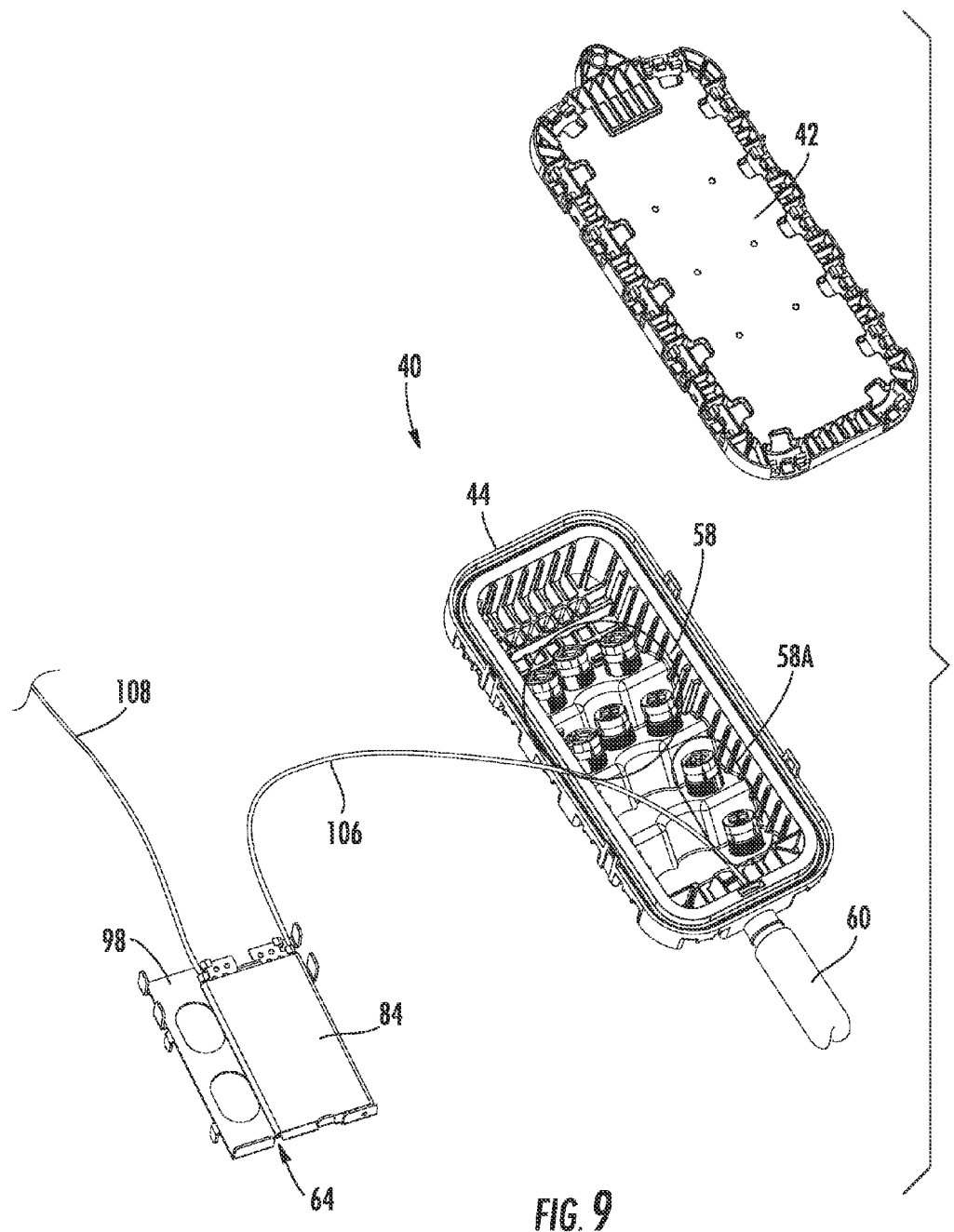
FIG. 9 is a perspective view of the multi-port optical connection terminal of FIGS. 2A and 2B illustrating an optical fiber from a distribution cable connected to a splice tray mounted to the bottom side of the mounting platform of FIGS. 5A and 5B.

As shown in FIGS. 8B and 9, the splice tray 84 does not rest on the entire bottom surface 98 of the mounting platform 64, but rather a portion. The access openings 96 are unobstructed in case the connector ports 58 are provided in the base 44 and disposed underneath the mounting platform 64 when mounted to the base 44. In this manner, connectorized optical fibers can be attached to the connector ports 58A (FIG. 9) inside the base 44 located beneath the mounting platform 64 with the mounting platform 64 installed in the base 44. Before or after the splice tray 84 is mounted to the mounting platform 64, an optical fiber 106 from the distribution cable 60 can be spliced into the splice tray 84, as illustrated in FIG. 9. A pigtail 108 or other optical fiber can be spliced to the optical fiber 106 to be connected to other optical components or directly to a connector port 58 to establish an optical connection between the optical fiber 106 from the distribution cable 60 and a connector port 58.

Figure 10:
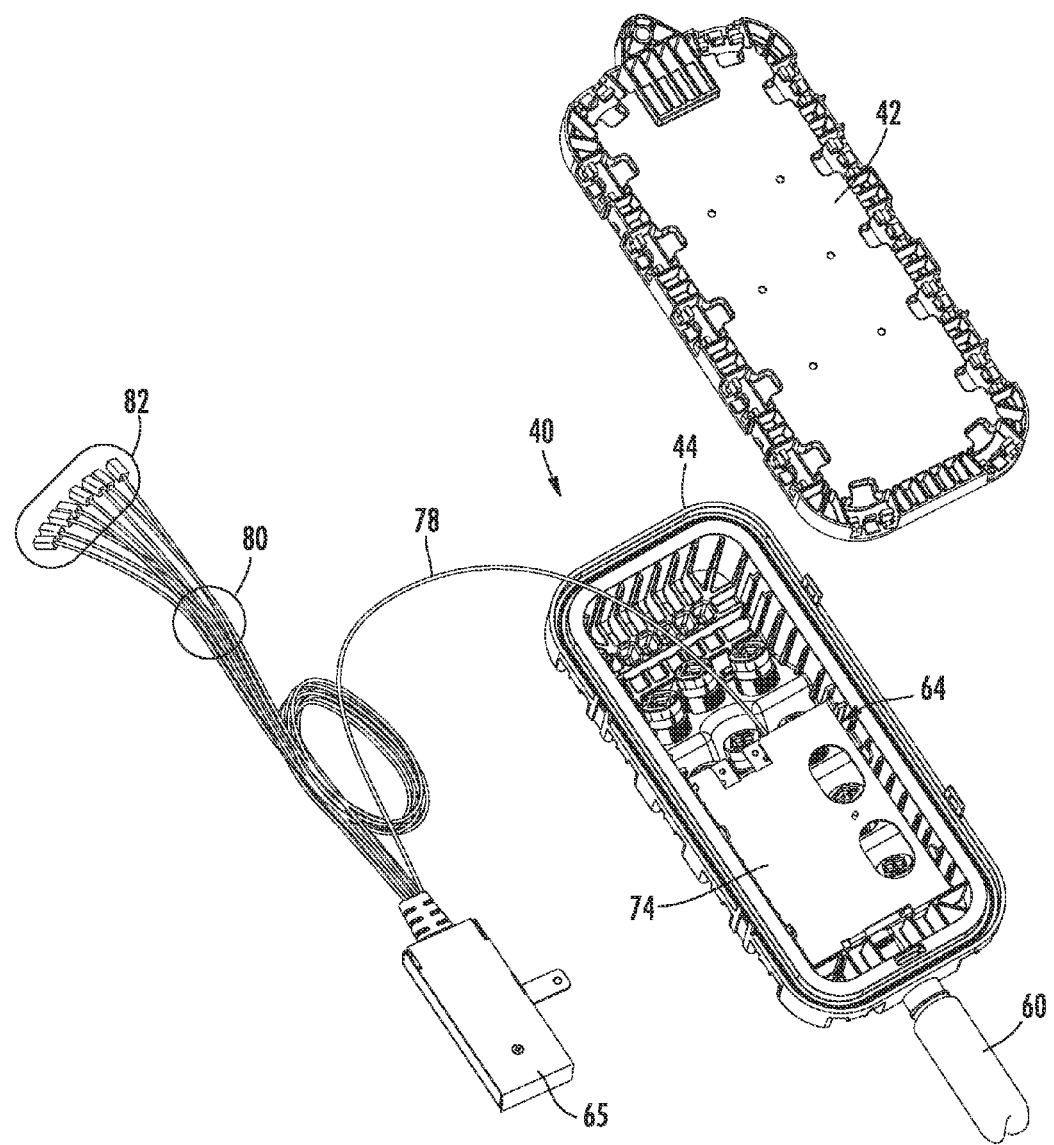
FIG. 10 is a perspective view of the multi-port optical connection terminal of FIGS. 2A and 2B illustrating an input fiber from an optical splitter spliced on the splice tray to an optical fiber of the distribution cable connected to a splice tray of FIG. 7.

After the splice tray 84 is mounted to the bottom surface 98 of the mounting platform, as illustrated in FIGS. 8A-9, the mounting platform 64 may be mounted inside the base 44, as illustrated in FIG. 10. FIG. 10 illustrates the optical splitter 65 of FIG. 4 that may also be mounted to the top surface 74 of the mounting platform 64 to be secured inside the multi-port optical connection terminal 40 along with the splice tray 84. However, note that a splice tray does not have to be mounted to the mounting platform 64 to mount an optical splitter, including the optical splitter 65, to the mounting platform 64. For example, it may be desired to split the optical fiber 106 connected to the splice tray 84 illustrated in FIG. 9 to the input fiber 78 of the optical splitter 65 to split the optical signal carried on the optical fiber 106 in the distribution cable 60. In this regard, the split optical signal for the optical fiber 106 of the distribution cable 60 can be carried on the output fibers 80, which may be connectorized and connected to the connector ports 58 and to any subscriber-side fibers (not shown) connected to the connector ports 58 exposed on the bottom side 62 of the base 44.

Figure 11:
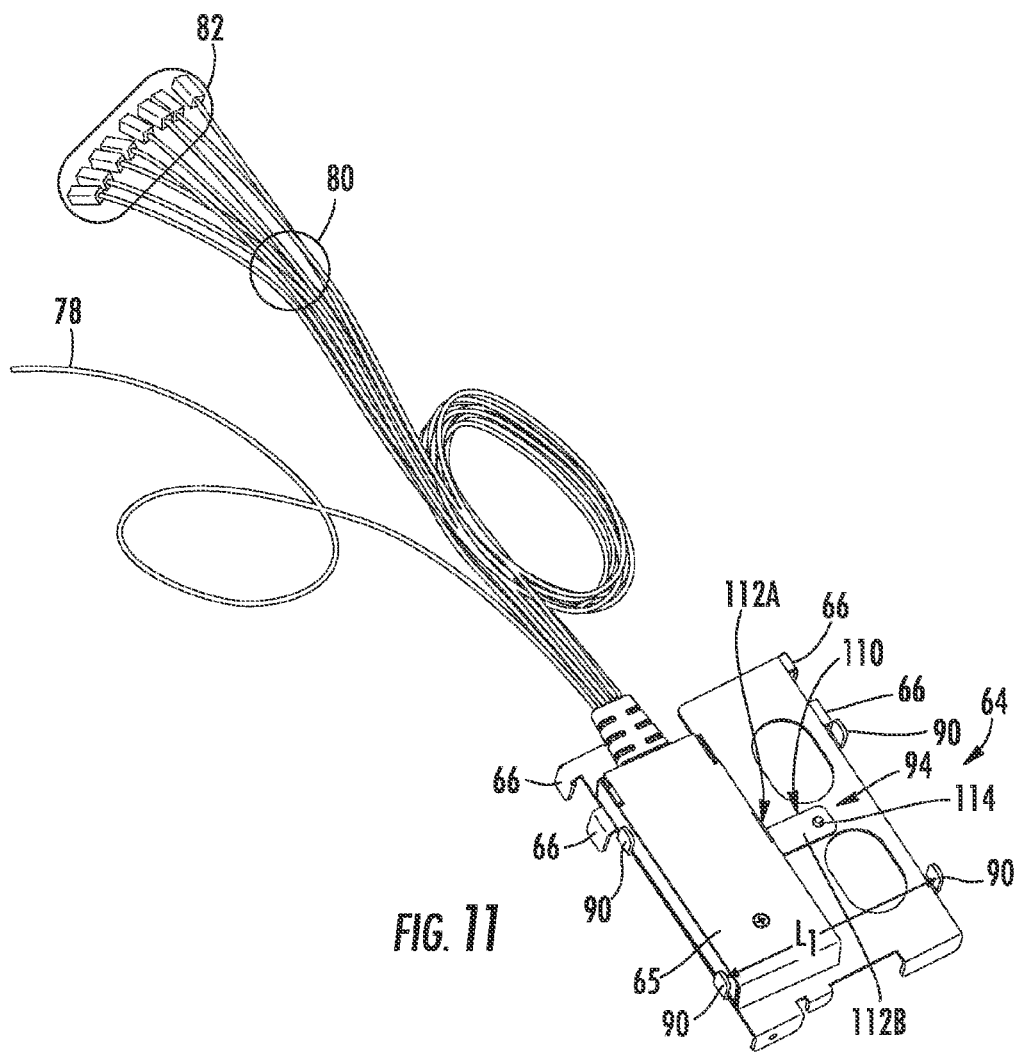
FIG. 11 is a perspective view of the optical splitter of FIG. 10 mounted to the top side of the mounting platform of FIGS. 5A and 5B mounted in the multi-port optical connection terminal of FIGS. 2A and 2B.

FIG. 11 illustrates the optical splitter 65 mounted to the top surface 74 of the mounting platform 64. As illustrated therein, the optical splitter 65 is placed on the top surface 74 and abutted on one side against the locking tabs 90, as previously described with respect to FIG. 5A. Because the optical splitter 65 does not span the length $L_1$ between the locking tabs 90 (see also, FIG. 5A), the optical splitter 65 in this embodiment is also secured to the mounting orifice 94 disposed through the top surface 74 of the mounting platform 64. An L-shaped mounting flange or bracket 110 is used wherein one side 112A abuts the side of the optical splitter 65 and the other side 112B is arranged orthogonal to the side 112A and rests flat on the top surface 74. A fastener 114 is used to secure the side 112A to the top surface. A fastener or other securing means (not shown) is also used to secure the optical splitter 65 to the side 112A. In this manner, the locking tabs 90 and the L-shaped bracket 110 secure the optical splitter 65 to the top surface 74 of the mounting platform 64. FIG. 3 previously discussed above shows the mounting platform 64 with the optical splitter 65 mounted thereto disposed in the base 44.

Figure 12:
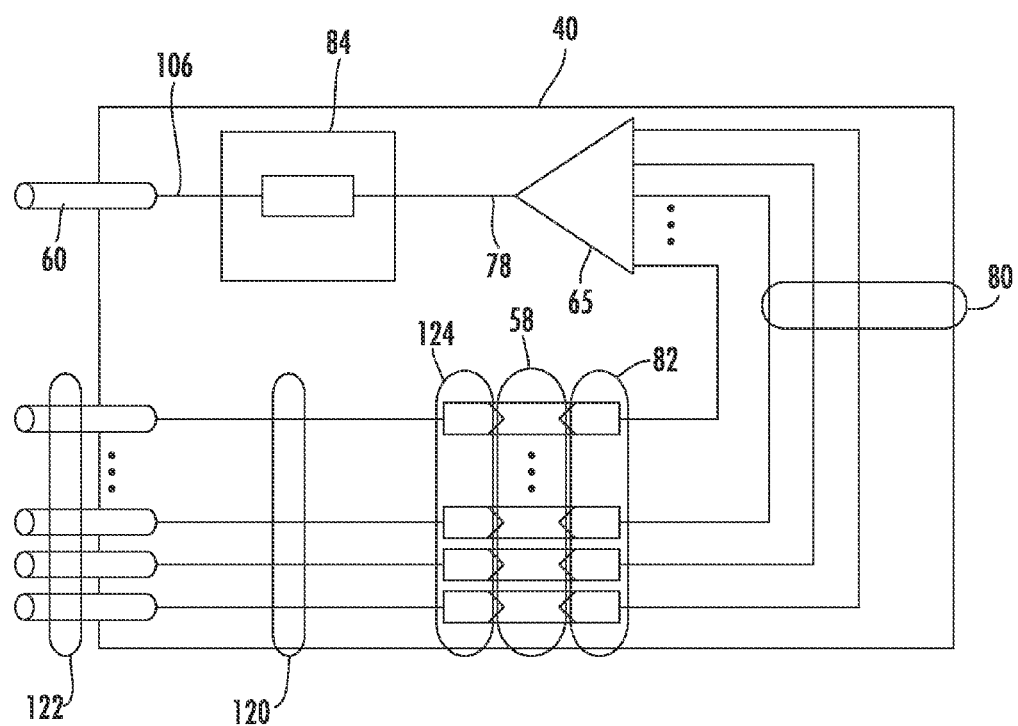
FIG. 12 is a block diagram of the multi-port optical connection terminal of FIG. 10 and the optical fiber connections made therein.

To summarize the optical connections made in the exemplary multi-port optical fiber connection port 40, FIG. 12 is a block diagram of the multi-port optical connection terminal embodiment of FIG. 10 with the optical splitter 65 mounted to the top surface 74 of the mounting platform 64 and the splice tray 84 mounted to the bottom surface 98 of the mounting platform 64 and disposed in the base 44. As illustrated in FIG. 12, the optical fiber connections made therein can be connected with subscriber-side optical fibers 120 from subscriber-side fiber optic cables 122 via connectorized ends 124 connected to the connector ports 58 to establish optical connections with the optical fiber 106 of the distribution cable 60.

Figure 13:
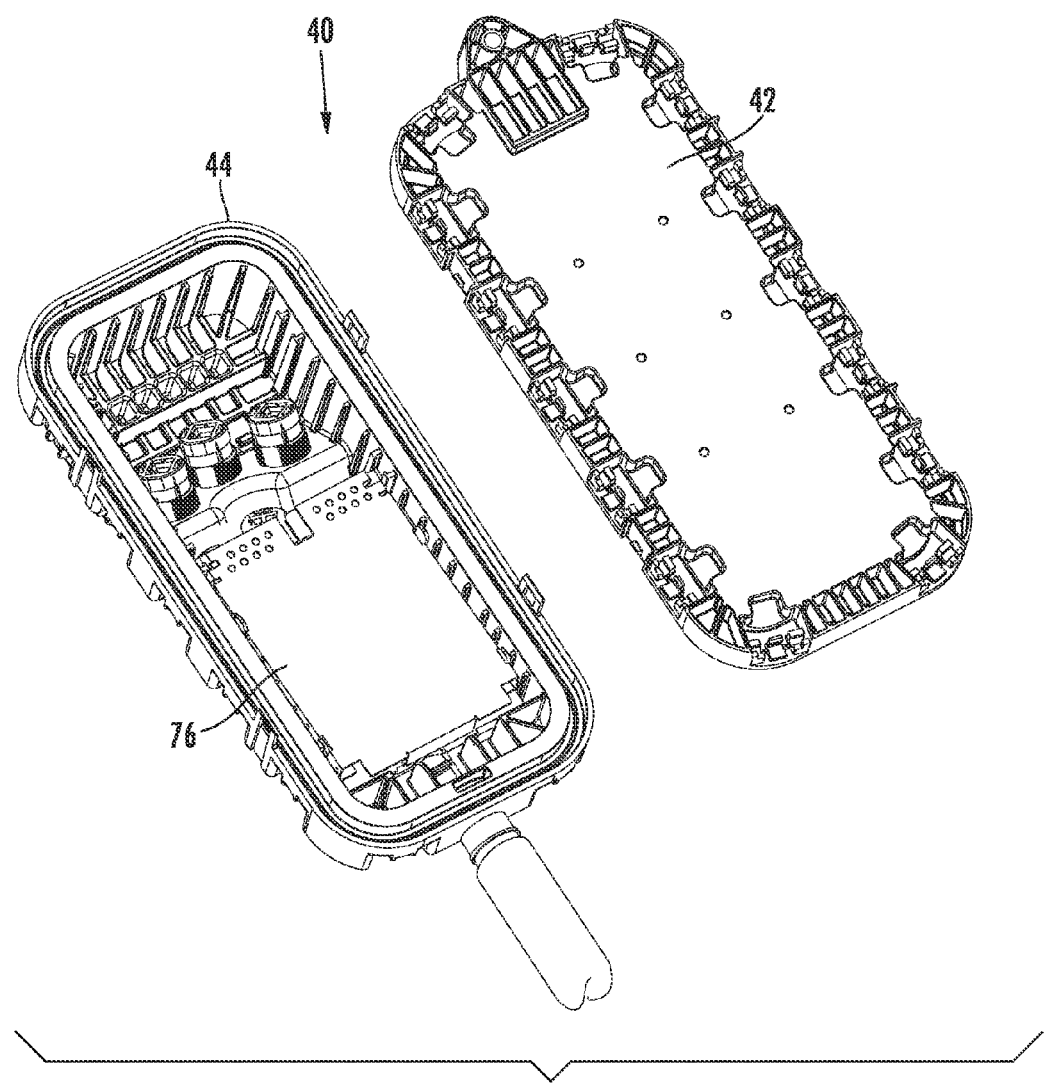
FIG. 13 is a perspective view of a second splice tray mounted to the top side of the mounting platform of FIGS. 5A and 5B.

FIG. 13 illustrates an alternate embodiment where a second splice tray, namely the splice tray 76 of FIG. 4, is mounted to the top surface 74 of the mounting platform 64 instead of the optical splitter 65, as illustrated in FIGS. 2 and 9-10. As illustrated in FIG. 13, the splice tray 76 mounts on the entire top surface 74 of the mounting platform 64 as opposed to the splice tray 84 in FIG. 8B that mounts on only a portion of the bottom surface 98 of the mounting platform 64. This is because more splices can be provided in the splice tray 76 than in the splice tray 84 in this embodiment. For example, the splice tray 84 may support up to four (4) splices and the splice tray 76 may support up to eight (8) splices. In this regard, mounting the splice trays 76, 84 on the mounting platform 64 and disposing the splice trays 76, 84 into the multi-port optical connection terminal 40 can provide up to eight (8) splices. The larger splice tray 76 may be employed to support eight (8) splices in this embodiment. For example, the distribution cable 60 may contain one (1), two (2), four (4), eight (8), or twelve (12) (with a multi-fiber splice) optical fibers that may need to be spliced in the multi-port optical connection terminal 40. In this regard, the splice tray 76, 84 that can support the desired number of splices can be mounted to the mounting platform 64. Alternatively, both splice trays 76, 84 may be mounted to the mounting platform 64 if more splices are desired. Providing for the ability to mount multiple splice trays on the mounting platform 64 provides more flexibility for different splice configurations provided in the multi-port optical connection terminal 40.

Figure 14A:
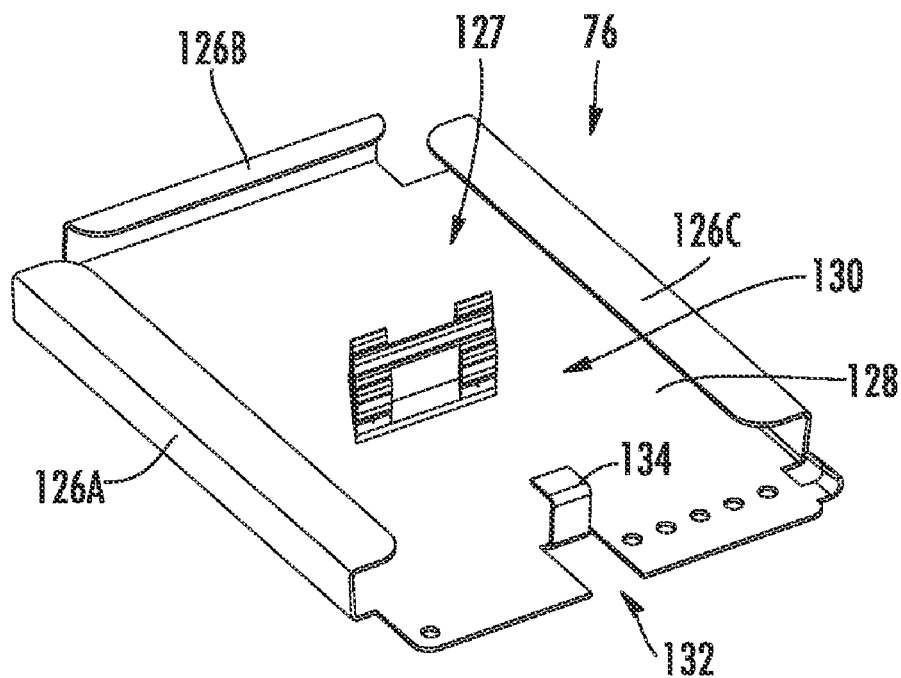
FIG. 14A is a perspective view of the bottom side of the second splice tray in FIG. 13.
Figure 14B:
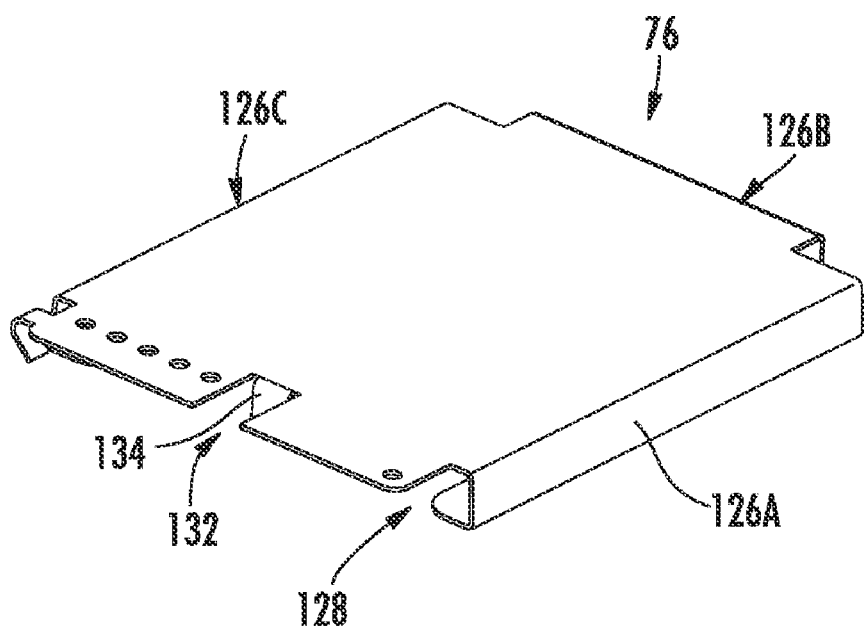
FIG. 14B is a perspective view of the top side of the second splice tray in FIG. 13.
Figure 15:
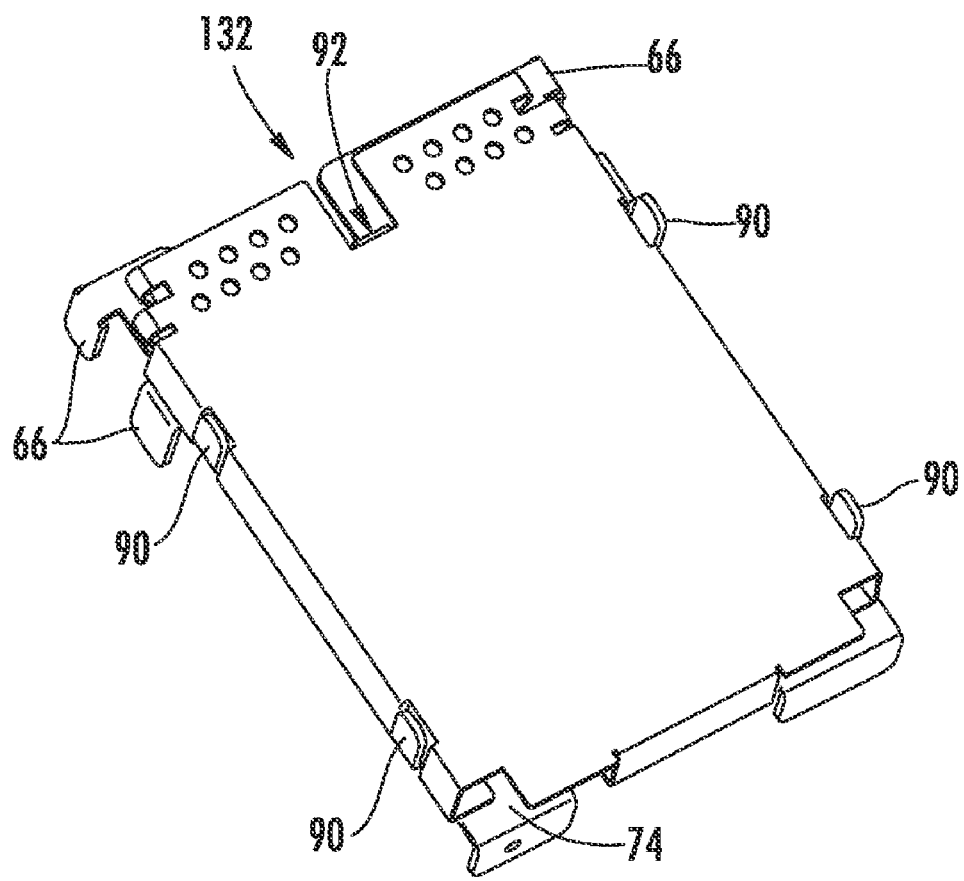
FIG. 15 is a perspective view of the second splice tray mounted to the top side of the mounting platform of FIGS. 5A and 5B.

FIGS. 14A and 14B illustrate the splice tray 76 of FIG. 13 in more detail. FIG. 14A illustrates a bottom view of the splice tray 76, and FIG. 14B illustrates a top view of the splice tray 76. As illustrated therein, the splice tray 76 contains folded up sides 126A, 126B, and 126C that provide an interior cavity 128 to support one or more splices 130, as illustrated in FIG. 14A. A notch 132 is disposed in the splice tray 76 by folding up a portion 134 of the splice tray 76 at right angles, as illustrated in FIG. 14A. As illustrated in FIG. 15, the splice tray 76 is configured to fit in between the locking tabs 90 when a bottom side 127 of the splice tray 76, as illustrated in FIG. 14A, is placed onto the top surface 74 of the mounting platform 64. The notch 132 is configured to be received by the positioning tab 92 (see also, FIG. 5A). The locking tabs 90 and the positioning tab 92 secure the splice tray 76 to the top surface 74 of the mounting platform 64.

Figure 16:
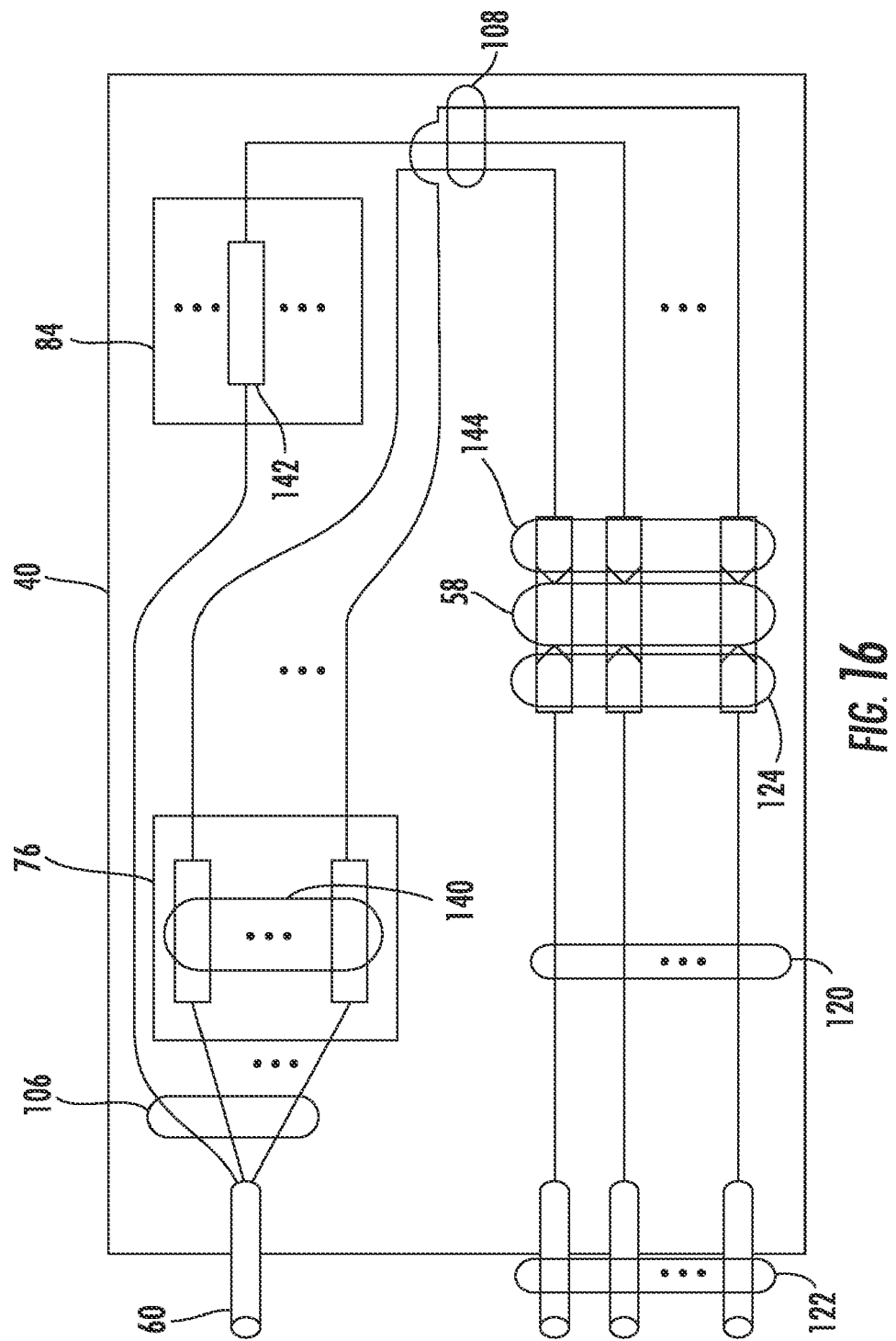
FIG. 16 is a block diagram of the multi-port optical connection terminal of FIG. 13 and the optical fiber connections made therein.

To summarize, FIG. 16 is a block diagram of the multi-port optical connection terminal embodiment of FIG. 15 with the splice tray 76 mounted to the top surface 74 of the mounting platform 64 and the splice tray 84 mounted to the bottom surface 98 of the mounting platform 64 and disposed in the base 44. As illustrated in FIG. 16, the optical fibers 106 from the distribution cable 60 can be spliced via splices 140, 142 provided in the splice trays 76 and 84, respectively, into pigtails 108 that are connectorized with connectors 144 and connected to the connector ports 58. As further illustrated in FIG. 16, optical fiber connections made therein can be connected with the subscriber-side optical fibers 120 from the subscriber-side fiber optic cables 122 via the connectorized ends 124 connected to the connector ports 58 to establish optical connections with the pigtails 108 and thus the optical fibers 106 of the distribution cable 60.

Further, as used herein, it is intended that the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Many modifications and other embodiments of the invention set forth herein will come to mind to one skilled in the art to which the invention pertains having the benefit of the teachings presented in the foregoing descriptions and the associated drawings. These modifications include, but are not limited to, the type of mounting platform, the disposition or attachment method in the optical connection terminal, the material choice for the mounting platform, the size of the mounting platform, whether the mounting platform supports optical components on one or more surfaces, the type of optical connection terminal in which the mounting platform can be included, and the type or number of optical components mounted to the mounting platform, as examples. For example, one or two splice trays, one or two optical splitters, or a combination of a splice tray(s) and optical splitter(s) may be mounted to the mounting platform and supported in the optical connection terminal. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A multiple port (multi-port) optical connection terminal, comprising:
   a base;
   a cover configured to attach to the base and defining an interior cavity;
   a mounting platform defining at least one mounting surface for mounting at least one optical component comprised from the group consisting of at least one splice tray and at least one optical splitter to the at least one mounting surface; and
   a plurality of mounting tabs extending from the mounting platform, each configured to extend into a channel disposed in at least one interior wall of the base to secure the mounting platform inside the interior cavity.

2. The multi-port optical connection terminal of claim 1, wherein at least one of the plurality of mounting tabs is configured to friction fit into the channel.

3. The multi-port optical connection terminal of claim 1, wherein each of the plurality of mounting tabs extends orthogonally from the at least one mounting surface of the mounting platform.

4. The multi-port optical connection terminal of claim 1, wherein the plurality of mounting tabs are disposed on at least two sides of the mounting platform.

5. The multi-port optical connection terminal of claim 1, further comprising a plurality of optical component tabs disposed on opposing ends of the mounting platform to secure the at least one optical component to the at least one mounting surface between the opposing ends.

6. The multi-port optical connection terminal of claim 5, wherein the plurality of optical component tabs are disposed on a first surface of the mounting platform.

7. The multi-port optical connection terminal of claim 6, further comprising a second plurality of optical component tabs disposed on opposing ends of a second surface of the mounting platform to secure the at least one optical component to the at least one mounting surface between the opposing ends on the second surface of the mounting platform.

8. The multi-port optical connection terminal of claim 5, wherein the plurality of optical component tabs are disposed on a second surface of the mounting platform.

9. The multi-port optical connection terminal of claim 1, further comprising at least one access opening disposed through the mounting platform to provide access to at least one connector port aligned with the at least one opening when the mounting platform is secured inside the interior cavity.

10. The multi-port optical connection terminal of claim 1, wherein the mounting platform is configured to be disposed along a top plane of the base when the mounting platform is secured inside the interior cavity.

11. The multi-port optical connection terminal of claim 10, wherein the at least one mounting surface forms a cover of the at least one optical component when mounted to the mounting platform.

12. The multi-port optical connection terminal of claim 1, wherein the at least one optical component is mounted to the mounting platform.

13. The multi-port optical connection terminal of claim 1, wherein the at least one optical component is further comprised of a first optical component mounted to a first surface of the mounting platform and a second optical component mounted to a second surface of the mounting platform.

14. The multi-port optical connection terminal of claim 13, wherein the first optical component is further comprised of either a first splice tray or an optical splitter and the second optical component is further comprised of a second splice tray or an optical splitter.

15. The multi-port optical connection terminal of claim 1, further comprising an opening disposed through the base configured to receive at least one optical fiber from a network-side cable.

16. The multi-port optical connection terminal of claim 15, wherein the at least one optical fiber is connected to the at least one optical component.

17. The multi-port optical component terminal of claim 1, further comprising a plurality of connector ports disposed in the base each configured to connect an optical fiber to the at least one optical component.

18. The multi-port optical component terminal of claim 1, further comprising at least one positioning tab disposed on the mounting platform.

19. The multi-port optical component terminal of claim 1, further comprising at least one standoff tab disposed on the mounting platform and configured to provide a standoff between the mounting platform and the base when the mounting platform is disposed in the base.

20. A method for disposing an optical splitter in a multiple port (multi-port) optical connection terminal, comprising:
   mounting an optical component comprised from the group consisting of a splice tray and an optical splitter to at least one mounting surface of a mounting platform;
   disposing a plurality of mounting tabs extending from the mounting platform into a plurality of channels disposed in at least one interior wall of a base to secure the mounting platform inside the base; and
   attaching a cover to the base disposed in the mounting platform and the optical component in an interior cavity.

21. The method of claim 20, further comprising mounting the optical component on a first surface of the at least one mounting surface of the mounting platform.

22. The method of claim 21, further comprising mounting a second splice tray on a second surface of the at least one mounting surface of the mounting platform.

23. The method of claim 20, further comprising mounting the optical component between a plurality of optical component tabs disposed on opposing ends of a first surface of the mounting platform.

24. The method of claim 20, further comprising mounting a second splice tray between a second plurality of optical component tabs disposed on opposing ends of a second surface of the mounting platform.

25. The method of claim 20, wherein the mounting platform is disposed along a top plane of the base when the mounting platform is secured inside the interior cavity.

26. The method of claim 20, wherein mounting the optical component to the at least one mounting surface of the mounting platform seals off an interior cavity of the optical component.

27. The method of claim 20, further comprising disposing at least one network-side optical fiber from a network-side cable into an opening disposed in the base.

28. The method of claim 27, further comprising connecting the at least one network-side optical fiber to the optical component.

29. The method of claim 28, further comprising connecting at least one connector port connected to at least one subscriber-side optical fiber and disposed in the base to the optical component to connect the at least one subscriber-side optical fiber to the at least one network-side optical fiber.

30. A multiple port (multi-port) optical connection terminal, comprising:
   a base;
   a cover configured to attach to the base and defining an interior cavity;
   a mounting platform defining a mounting surface and having a plurality of mounting tabs extending from the mounting platform and each configured to extend into a channel disposed in at least one interior wall of the base to secure the mounting platform inside the interior cavity;
   a first splice tray mounted to a first surface of the mounting surface of the mounting platform and configured to splice at least one network-side optical fiber into at least one input optical fiber;
   an optical splitter mounted to a second surface of the mounting surface parallel to the first surface of the mounting surface and configured to split the at least one input optical fiber into a plurality of output optical fibers;
   a plurality of fiber optic adapters disposed in the base and each configured to the plurality of output optical fibers; and
   a plurality of subscriber-side optical fibers connected to the plurality of fiber optic adapters.

* * * * *